US012693371B2

(12) United States Patent

Lettow et al.

(10) Patent No.: US 12,693,371 B2

(45) Date of Patent: Jul. 28, 2026

(54) SYSTEM TO DETERMINE THE LOCATION OF A RADIO FREQUENCY SOURCE USING RADIO FREQUENCY SIGNAL STRENGTH AND RELATED METHODS

(71) Applicant: Vorbeck Materials Corp., Jessup, MD (US)

(72) Inventors: John Lettow, Washington, MD (US); Sriram Manivannan, Elkridge, MD (US); Dan Scheffer, Frederick, MD (US); James Allen Turney, Silver Spring, MD (US); Christie Burrow, New Market, MD (US); Samarpita Chowdhury, Baltimore, MD (US); Victor Contreras, Baltimore, MD (US); Trentice Bolar, Columbia, MD (US)

(73) Assignee: Vorbeck Materials Corp., Columbia, MD (US)

( * ) Notice: Subject to any disclaimer, the term of this patent is extended or adjusted under 35 U.S.C. 154(b) by 981 days.

(21) Appl. No.: 17/894,991

(22) Filed: Aug. 24, 2022

(65) Prior Publication Data

US 2023/0280440 A1 Sep. 7, 2023

Related U.S. Application Data

(63) Continuation of application No. 17/821,467, filed on Aug. 22, 2022, now Pat. No. 12,270,927, which is a
(Continued)

(51) Int. Cl.
*G01S 5/06* (2006.01)
*H01Q 1/02* (2006.01)
(Continued)

(52) U.S. Cl.
CPC ................. *G01S 5/06* (2013.01); *H01Q 1/02* (2013.01); *H01Q 1/273* (2013.01); *H01Q 1/526* (2013.01)

(58) Field of Classification Search
CPC . G01S 5/06; H01Q 1/02; H01Q 1/273; H01Q 1/526
See application file for complete search history.

(56) References Cited

U.S. PATENT DOCUMENTS

| 9,768,513 B2 * | 9/2017 | Lee | ........................ | H01Q 21/28 |
| 11,997,781 B2 * | 5/2024 | Ali | ...................... | H05K 9/0024 |

(Continued)

*Primary Examiner* — Junpeng Chen

(74) *Attorney, Agent, or Firm* — Woods Oviatt Gilman LLP; Trent V. Bolar, Esq.

(57) ABSTRACT

Embodiments relate to a communications node that includes an interfacing plate assembly; an antenna assembly; a board mounting assembly; a housing; and an enclosure. The housing includes the antenna assembly and the board mounting assembly. The enclosure is a rigid, open ended, sleeve structure that selectively receives the housing and thereby encloses the antenna assembly and the board mounting assembly therein. An interfacing plate assembly is positioned at a second end. The interfacing plate includes an input device coupled to the control circuit that receives user operational input. The antenna assembly includes an antenna frame that includes the antenna elements and orients the antenna elements in each nodal cardinal direction. The board mounting assembly includes the communication device and the control circuit that are positioned proximate to a plate. The plate is coupled to the first end opposite the interfacing plate and thermally coupled to the control circuit.

18 Claims, 39 Drawing Sheets

Related U.S. Application Data continuation-in-part of application No. 17/749,129, filed on May 19, 2022, now Pat. No. 12,431,932, application No. 17/894,991, filed on Aug. 24, 2022 is a continuation-in-part of application No. 16/925,581, filed on Jul. 10, 2020, now Pat. No. 11,265,410.

(60) Provisional application No. 63/338,696, filed on May 5, 2022, provisional application No. 63/190,449, filed on May 19, 2021, provisional application No. 62/957,421, filed on Jan. 6, 2020, provisional application No. 63/224,702, filed on Jul. 22, 2021.

(51) Int. Cl.
  *H01Q 1/27*    (2006.01)
  *H01Q 1/52*    (2006.01)

(56)      References Cited

U.S. PATENT DOCUMENTS

| | | | |
|---|---|---|---|
| 2019/0188043 A1* | 6/2019 | Jalai | G06F 9/4875 |
| 2020/0259737 A1* | 8/2020 | Koshy | H04W 28/0883 |
| 2020/0280853 A1* | 9/2020 | Osborn | G01S 5/0295 |
| 2020/0411965 A1* | 12/2020 | Chu | H01Q 1/2291 |
| 2021/0100065 A1* | 4/2021 | Lee | H05K 7/2039 |

* cited by examiner

GENERATE A FIRST NOTIFICATION WHEN THE WAN IS ESTABLISHED — 1360

GENERATE A SECOND NOTIFICATION WHEN THE WAN IS NOT ESTABLISHED — 1370

CONVEY, VIA THE OUTPUT DEVICE, THE FIRST NOTIFICATION — 1380

CONVEY, VIA THE OUTPUT DEVICE THE SECOND NOTIFICATION — 1390

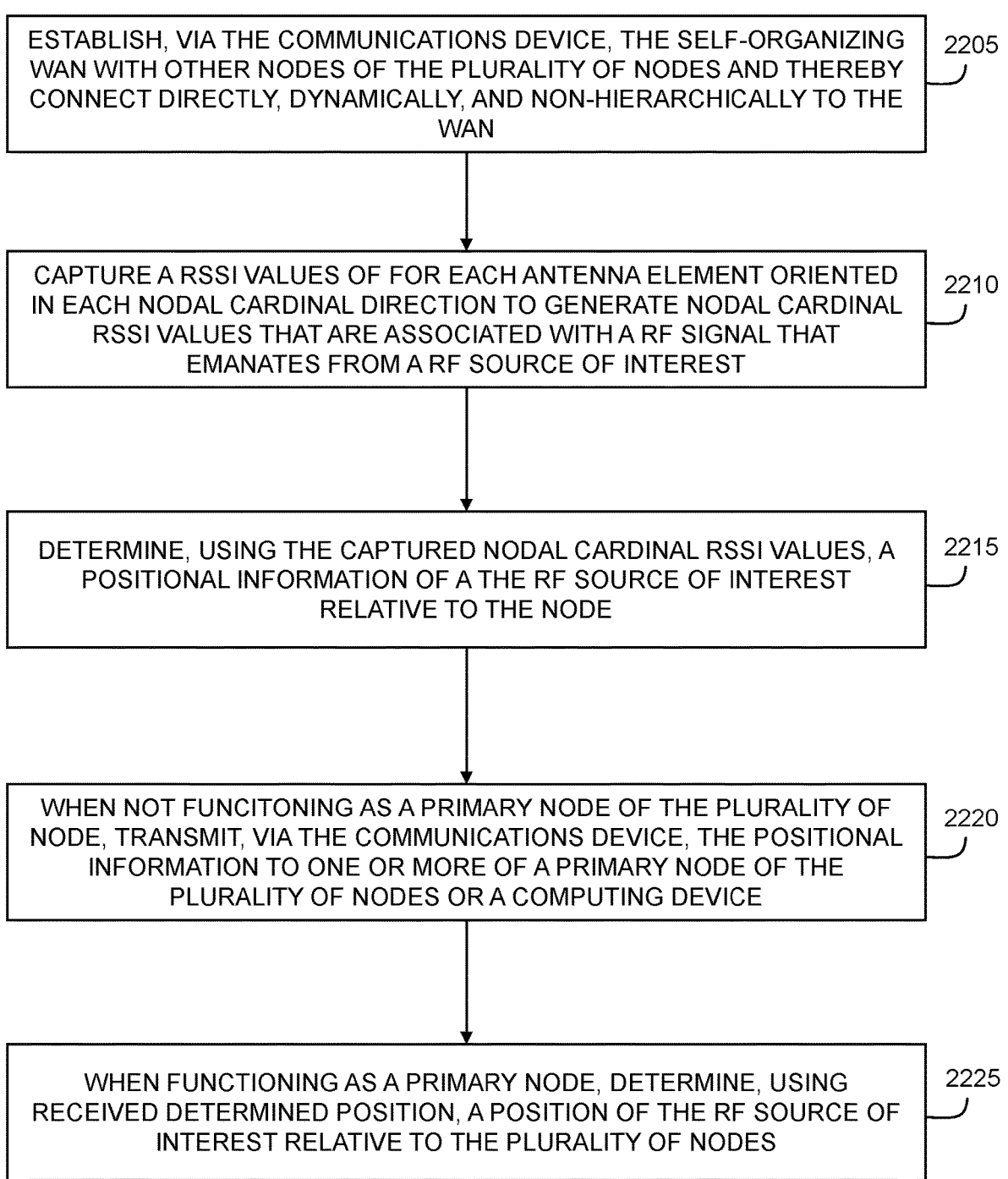

ESTABLISH, VIA THE COMMUNICATIONS DEVICE, THE SELF-ORGANIZING WAN WITH OTHER NODES OF THE PLURALITY OF NODES AND THEREBY CONNECT DIRECTLY, DYNAMICALLY, AND NON-HIERARCHICALLY TO THE WAN — 2205

CAPTURE A RSSI VALUES OF FOR EACH ANTENNA ELEMENT ORIENTED IN EACH NODAL CARDINAL DIRECTION TO GENERATE NODAL CARDINAL RSSI VALUES THAT ARE ASSOCIATED WITH A RF SIGNAL THAT EMANATES FROM A RF SOURCE OF INTEREST — 2210

DETERMINE, USING THE CAPTURED NODAL CARDINAL RSSI VALUES, A POSITIONAL INFORMATION OF A THE RF SOURCE OF INTEREST RELATIVE TO THE NODE — 2215

WHEN NOT FUNCITONING AS A PRIMARY NODE OF THE PLURALITY OF NODE, TRANSMIT, VIA THE COMMUNICATIONS DEVICE, THE POSITIONAL INFORMATION TO ONE OR MORE OF A PRIMARY NODE OF THE PLURALITY OF NODES OR A COMPUTING DEVICE — 2220

WHEN FUNCTIONING AS A PRIMARY NODE, DETERMINE, USING RECEIVED DETERMINED POSITION, A POSITION OF THE RF SOURCE OF INTEREST RELATIVE TO THE PLURALITY OF NODES — 2225

FIG. 22A

CAUSING THE RF SWITCH TO SUCCESSIVELY ACTIVATE EACH ANTENNA ELEMENT IN A PREDETERMINED ORDER — 2505

CAPTURING, VIA THE COMMUNICATIONS DEVICE, THE RSSI VALUE OF EACH ANTENNA ELEMENT WHEN ACTIVATED — 2510

DETERMINING AT LEAST TWO CARDINAL RSSI VALUES THAT ARE GREATER THAN A PREDETERMINED AMOUNT THEREBY DETERMINING ANTENNA ELEMENTS OF INTEREST — 2515

CAPTURING, VIA THE GEOLOCATION SENSOR, GEOLOCATION DATA ASSOCIATED WITH THE NODE — 2605

DETERMINING, USING THE GEOLOCATION DATA AND THE CARDINAL RSSI VALUES, AN ORIENTATION OF THE ANTENNA ELEMENTS OF INTEREST AND AN ANGLE OF THE RF SOURCE OF INTEREST RELATIVE TO THE ANTENNA ELEMENTS OF INTEREST — 2610

2700

2700

2835

2830

2810

2815

2825

2820

2815

CAPTURE, VIA THE CAMERA, AN IMAGE — 3505

DETERMINE A PRESENCE OF A PREDETERMINED OBJECT IN THE IMAGE USING A MACHINE LEARNING ALGORITHM — 3510

GENERATE A FIRST NOTIFICATION WHEN THE PRESENCE OF THE PREDETERMINED OBJECT IN THE IMAGE IS DETERMINED — 3515

GENERATE A SECOND NOTIFICATION WHEN THE PRESENCE OF THE PREDETERMINED OBJECT IN THE IMAGE IS NOT DETERMINED — 3520

SYSTEM TO DETERMINE THE LOCATION OF A RADIO FREQUENCY SOURCE USING RADIO FREQUENCY SIGNAL STRENGTH AND RELATED METHODS

CROSS-REFERENCE TO RELATED APPLICATIONS

This application is a continuation-in-part of U.S. patent application Ser. No. 17/749,129 filed May 19, 2022, which claims the benefit of U.S. Provisional Application No. 63/190,449 filed May 19, 2021, which is a continuation-in-part of U.S. patent application Ser. No. 16/925,581 filed Jul. 10, 2020 (issued as U.S. Pat. No. 11,265,410), which claims the benefit of U.S. Provisional Application No. 62/957,421 filed Jan. 6, 2020. This application also claims the benefit of U.S. Provisional Application No. 63/224,702 filed Jul. 22, 2021. These applications are hereby incorporated herein by reference.

TECHNICAL FIELD

Background

The present invention relates generally to communications nodes and specifically to wearable communications nodes with mesh networking capabilities.

Data communication networks may include various, hubs, switches, routers, and other network devices, interconnected and configured to handle data as it passes through the network. These devices will be referred to herein as "network elements." Data is communicated through the data communication network by passing data packets (or cells, frames, or segments) between the network elements by utilizing one or more communication links. A particular packet may be handled by multiple network elements and cross multiple communication links as it travels between its source and its destination over the network. Links may be formed over physical structures, such as copper cables and optical fibers, or over wireless links formed using infra-red transmissions or transmissions in a portion of the electro-magnetic spectrum.

Network elements can be used to form a wireless mesh network. One characteristic of a mesh network is that in a mesh network there are generally multiple paths through the network that a given user may employ to reach the access point. By allowing traffic to hop from user to user, instead of requiring wireless transmission to take place directly between the user and an access point, it is possible to provide enhanced signal quality to users, especially where the signal may be impeded due to obstacles and other naturally occurring signal impediments. In a mesh network, an access point serves as a connection between the mesh network and a higher bandwidth communication resource, and relay points in the mesh network handle traffic for themselves and for neighboring users.

One example of a mesh network is an 802.11b access mesh. If a set of users in close geographical proximity are equipped with 802.11b cards, they can communicate with other users in a series of hops until reaching an access point of the mesh network. Typically the access point is connected to a fixed network using a point-to-point link such as an optical fiber, copper loop, or via another wireless transmission. Due to latency and system complexity the number of wireless router hops is typically kept to some maximum, for example six. This limits the area of coverage of a wireless mesh network to a "cluster" or neighborhood community, the clusters being connected to the fixed network via the access points. Additional access points may be added to reduce the number of hops between users and access points, and hence to reduce latency and an amount of occupied bandwidth on the mesh.

An example of a conventional arrangement of wireless meshes is shown in FIG. 1A. Another example of a wireless mesh network is given in US Patent application publication no. US 2002/0159409 A1, the content of which is hereby incorporated herein by reference. In the example illustrated in FIG. 1A, a number of different mesh networks 10 are shown, each of which may be on the scale of a neighborhood. Each mesh network 10 has a number of relay points 1 connected together and configured to handle traffic on the mesh. For example, each household in a neighborhood may be a relay point in the mesh network, the relay points being interconnected using 802.11b wireless links 14. It is noted that there may be further 802.11b devices communicating with a given relay point's location, such as in a Local Area Network (LAN) or Personal Area Network (PAN). These devices use the same technology as the relay point, can communicate with other relay points, and are considered part of the same mesh network.

In the example illustrated in FIG. 1A, each mesh network 10 has an access point 16 connected to a higher bandwidth communication resource such as a Wide Area Network (WAN) base station 18 via a first tier backhaul link 20. The backhaul links 20 may be formed using a conventional point-to-point or point-to-multipoint wireless or wireline technology. In either instance, there is a single path from each access point 16 to the WAN base station 18. In the example shown in FIG. 1B, the WAN base station 18 is connected via second tier wired or wireless backhaul link(s) 22 to further networking equipment, such as a central office 24. Due to the large number of first tier backhaul links 20, the full capacity of the first tier backhaul links may not be utilized. Indeed, depending on network architecture, the first tier backhaul links may be required to carry as little as 5% of their available capacity to prevent the call blocking ratio on the secondary backhaul link 22 from becoming onerous. This underutilization of the first tier backhaul links represents an over-provisioning in the first tier backhaul network which is necessary, given the limited geographical range of the mesh networks 10 being served by the first tier backhaul links 20.

Hand-held (i.e. portable) communications systems, such as walkie-talkies and other portable radio transceivers, are used by military personnel, law enforcement officials, first responders, as well as civilians. However, such systems typically utilize one or more conspicuous antennas, such as whip antennas, which typically consist of a straight flexible metal wire or rod embedded in polymer material. The bottom end of whip antennas are communicatively coupled to the transceiver of the handheld communications system. Whip antennas are typically designed to be flexible to reduce breaking. However, such antennas are increasingly deployed in environments where identification of the communications personnel and/or their locations may not be desired (e.g., military theaters and clandestine operations). Even more, such antennas are typically vulnerable to entanglement in foliage or debris, and damage in disaster and emergency, as well as high population density environments. Therefore, a mesh networking wearable communications system with antennas that are not vulnerable to entanglement would be beneficial to consumers.

BRIEF DESCRIPTION OF THE DRAWINGS

FIG. 22A illustrates operational steps of a RF localization system ("RFLS") to enable the determination of the position of a RF source of interest relative to the RFLS, in accordance with some embodiments.

DETAILED DESCRIPTION

Figure 1A:
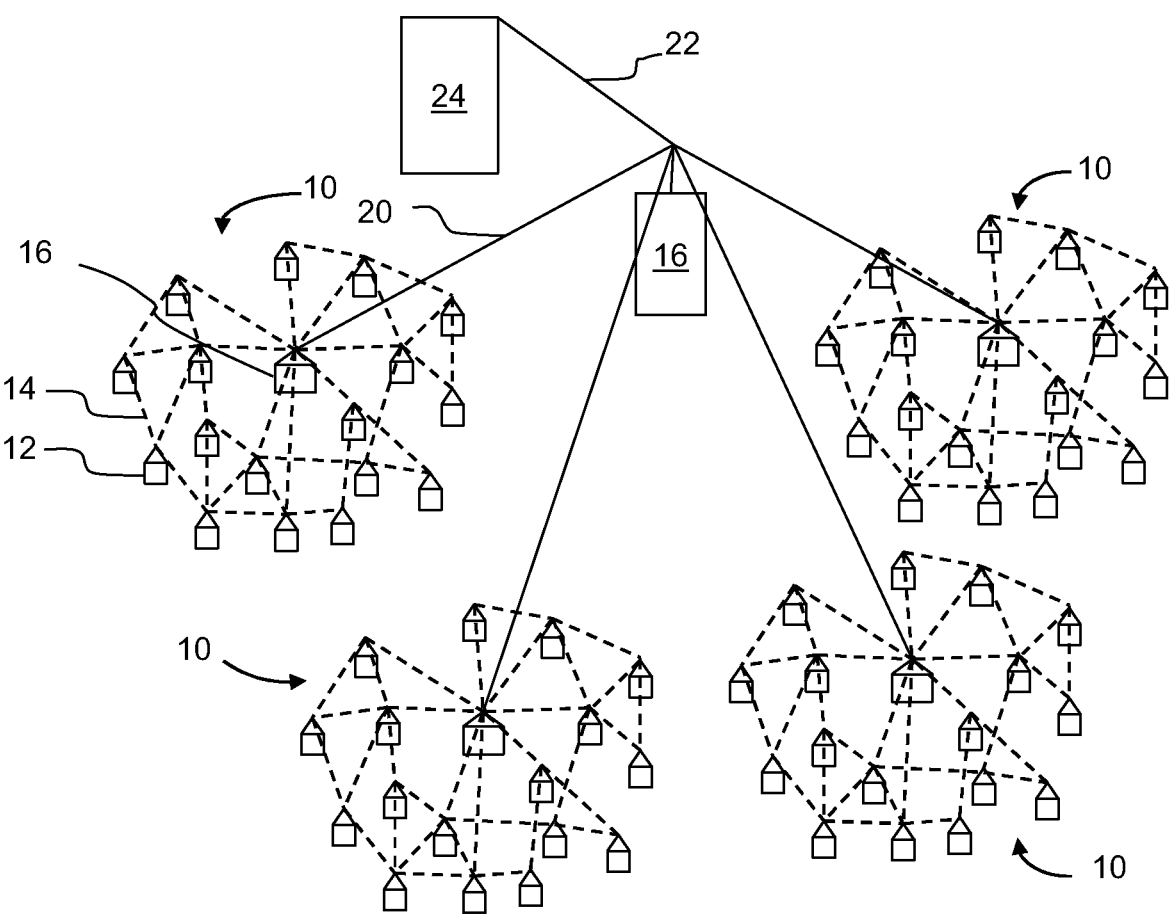
FIG. 1A is prior art that depicts a conventional arrangement of wireless mesh communications network.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Certain terminology may be employed in the following description for convenience rather than for any limiting purpose. For example, the terms "forward" and "rearward," "front" and "rear," "right" and "left," "upper" and "lower," and "top" and "bottom" designate directions in the drawings to which reference is made, with the terms "inward," "inner," "interior," or "inboard" and "outward," "outer," "exterior," or "outboard" referring, respectively, to directions toward and away from the center of the referenced element, the terms "radial" or "horizontal" and "axial" or "vertical" referring, respectively, to directions or planes which are perpendicular, in the case of radial or horizontal, or parallel, in the case of axial or vertical, to the longitudinal central axis of the referenced element, the terms "downstream" and "upstream" referring, respectively, to directions in and opposite that of fluid flow, and the terms "proximate" and "distal" referring, respectively, to positioning that is near or situated away from a point of reference. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows. Angles may be designated as "included" as measured relative to surfaces or axes of an element and as defining a space bounded internally within such element therebetween, or otherwise without such designation as being measured relative to surfaces or axes of an element and as defining a space bounded externally by or outside of such element therebetween. Generally, the measures of the angles stated are as determined relative to a common axis, which axis may be transposed in the figures for purposes of convenience in projecting the vertex of an angle defined between the axis and a surface which otherwise does not extend to the axis. The term "axis" may refer to a line or to a transverse plane through such line as will be apparent from context. As used herein, "RF" refers to radio frequency; "RF signal" refers to a wireless signal; and "RF source" refers to a source that emits wireless signals.

As will be appreciated by one skilled in the art, aspects of the instant disclosure may be embodied as a system, method or computer program product. Accordingly, aspects of the instant disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the instant disclosure may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Data communication networks may include various, hubs, switches, routers, and other network devices, interconnected and configured to handle data as it passes through the network. These devices will be referred to herein as "network elements." Data is communicated through the data communication network by passing data packets (or cells, frames, or segments) between the network elements by utilizing one or more communication links. A particular packet may be handled by multiple network elements and cross multiple communication links as it travels between its source and its destination over the network. Links may be formed over physical structures, such as copper cables and optical fibers, or over wireless links formed using infra-red transmissions or transmissions in a portion of the electromagnetic spectrum.

Network elements can be used to form a wireless mesh network. One characteristic of a mesh network is that in a mesh network there are generally multiple paths through the network that a given user may employ to reach the access point. By allowing traffic to hop from user to user, instead of requiring wireless transmission to take place directly between the user and an access point, it is possible to provide enhanced signal quality to users, especially where the signal may be impeded due to obstacles and other naturally occurring signal impediments. In a mesh network, an access point serves as a connection between the mesh network and a higher bandwidth communication resource, and relay points in the mesh network handle traffic for themselves and for neighboring users.

One example of a mesh network is an 802.11b access mesh. If a set of users in close geographical proximity are equipped with 802.11b cards, they can communicate with other users in a series of hops until reaching an access point of the mesh network. Typically the access point is connected to a fixed network using a point-to-point link such as an optical fiber, copper loop, or via another wireless transmission. Due to latency and system complexity the number of wireless router hops is typically kept to some maximum, for example six. This limits the area of coverage of a wireless mesh network to a "cluster" or neighborhood community, the clusters being connected to the fixed network via the access points. Additional access points may be added to reduce the number of hops between users and access points, and hence to reduce latency and an amount of occupied bandwidth on the mesh.

An example of a conventional arrangement of wireless meshes is shown in FIG. 1A. Another example of a wireless mesh network is given in US Patent application publication no. US 2002/0159409 A1, the content of which is hereby incorporated herein by reference. In the example illustrated in FIG. 1A, a number of different mesh networks 10 are shown, each of which may be on the scale of a neighborhood. Each mesh network 10 has a number of relay points 1 connected together and configured to handle traffic on the mesh. For example, each household in a neighborhood may be a relay point in the mesh network, the relay points being interconnected using 802.11b wireless links 14. It is noted that there may be further 802.11b devices communicating with a given relay point's location, such as in a Local Area Network (LAN) or Personal Area Network (PAN). These devices use the same technology as the relay point, can communicate with other relay points, and are considered part of the same mesh network.

Figure 1B:
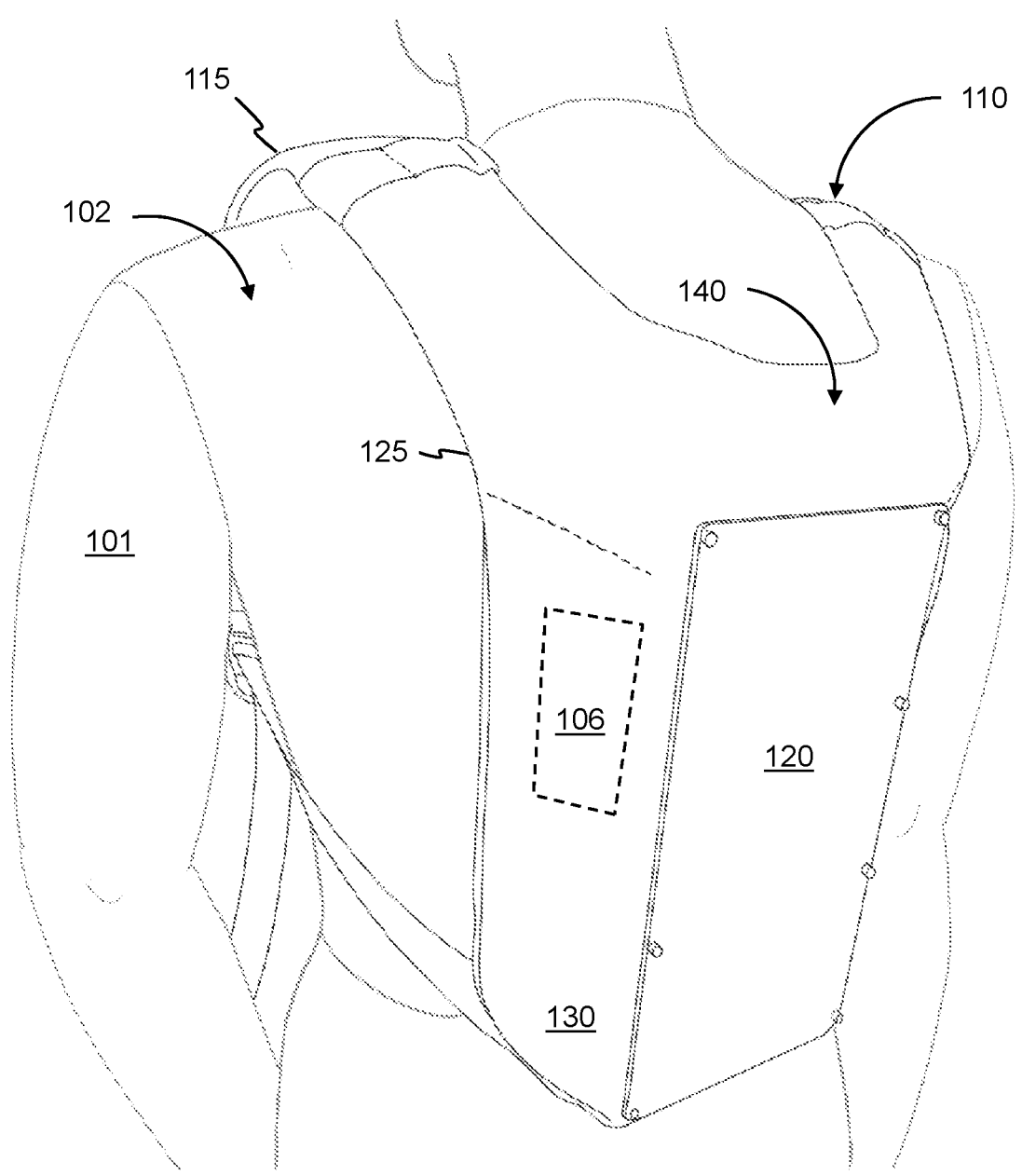
FIG. 1B illustrates a rear view of a user wearing a wearable communications node (hereinafter "WCN"), in accordance with some embodiments.
Figure 2:
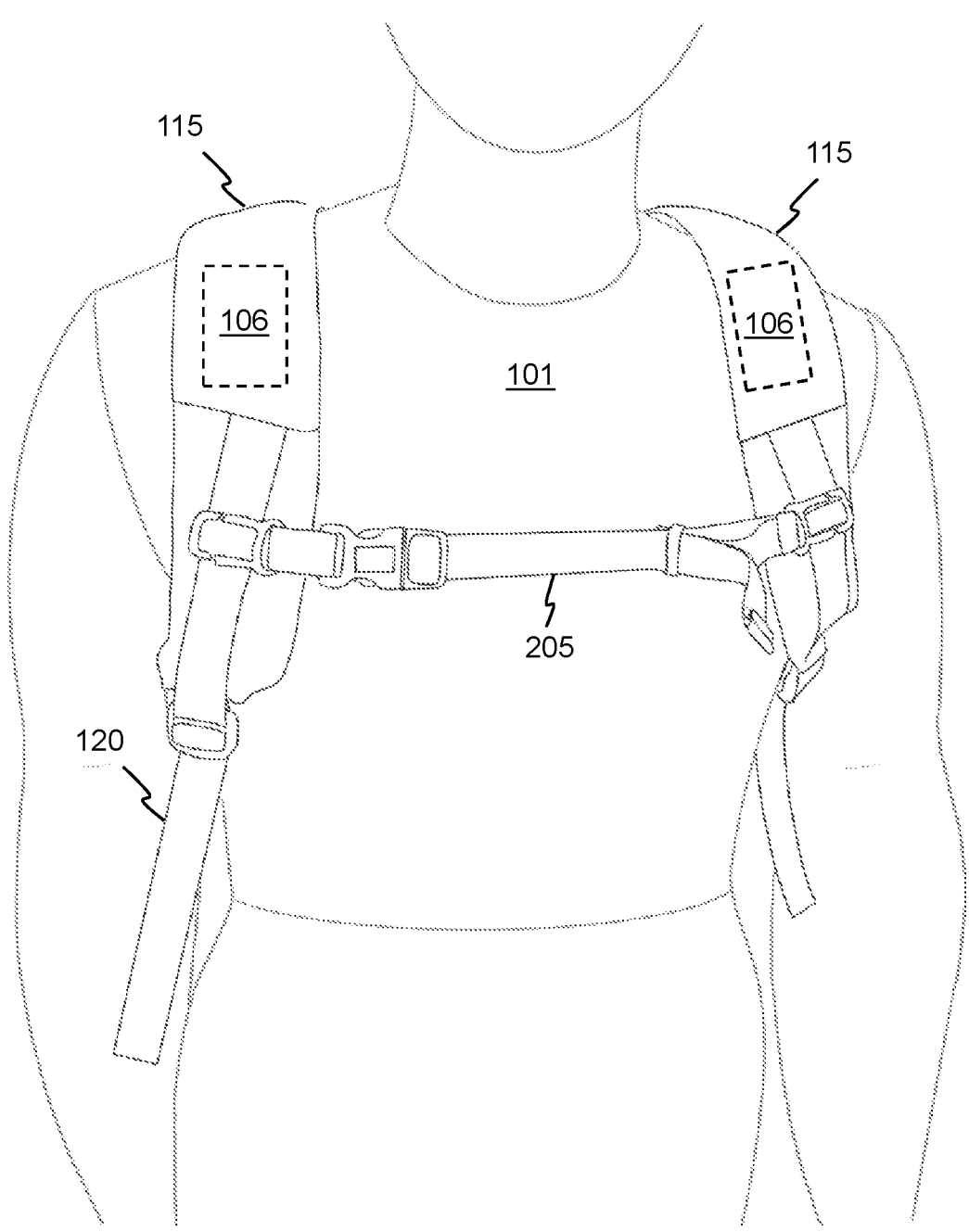
FIG. 2 illustrates front view of the user from FIG. 1B wearing the WCN, in accordance with yet still other embodiments.
Figure 3:
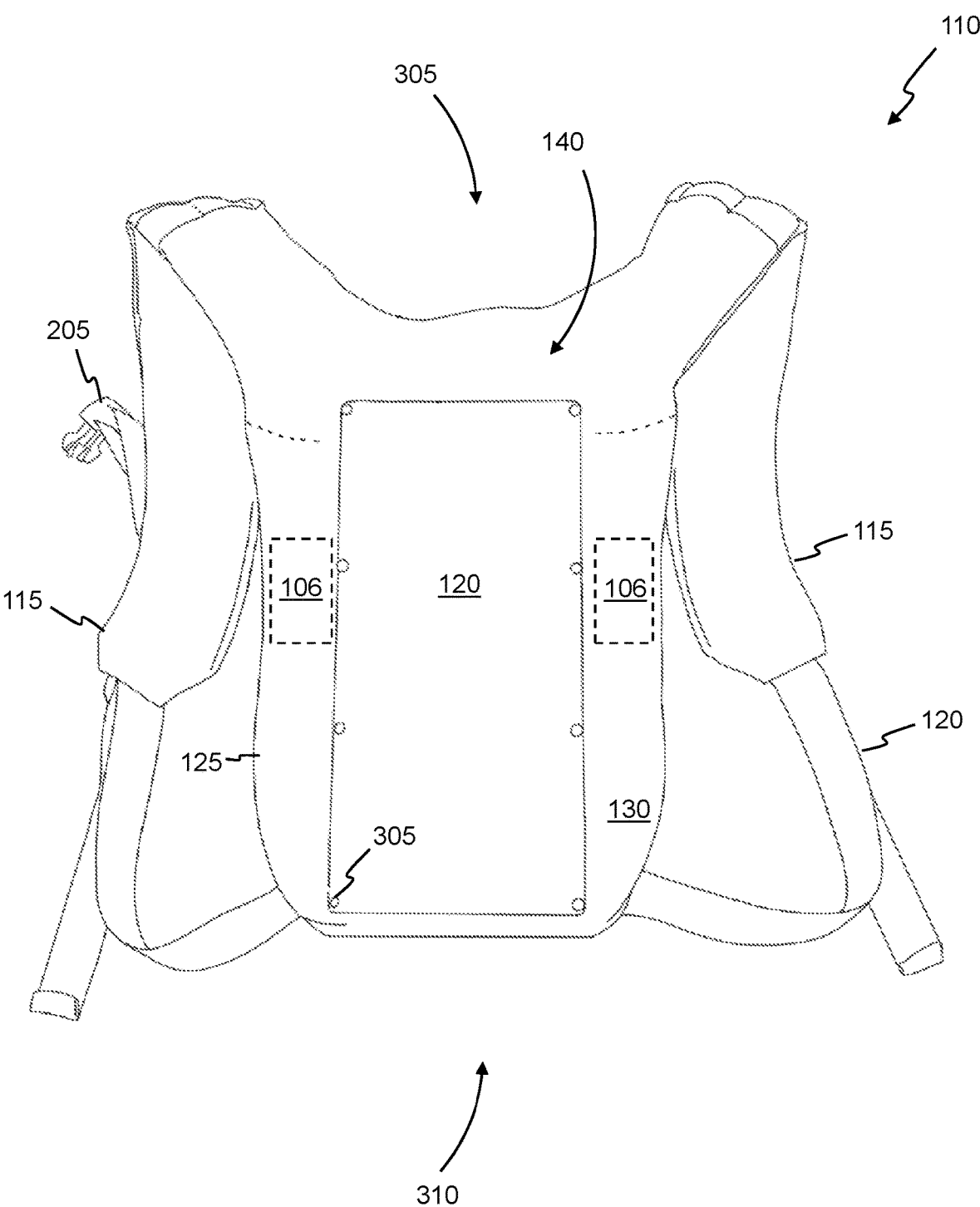
FIG. 3 illustrates a front view of the WCN, in accordance with other embodiments.
Figure 4:
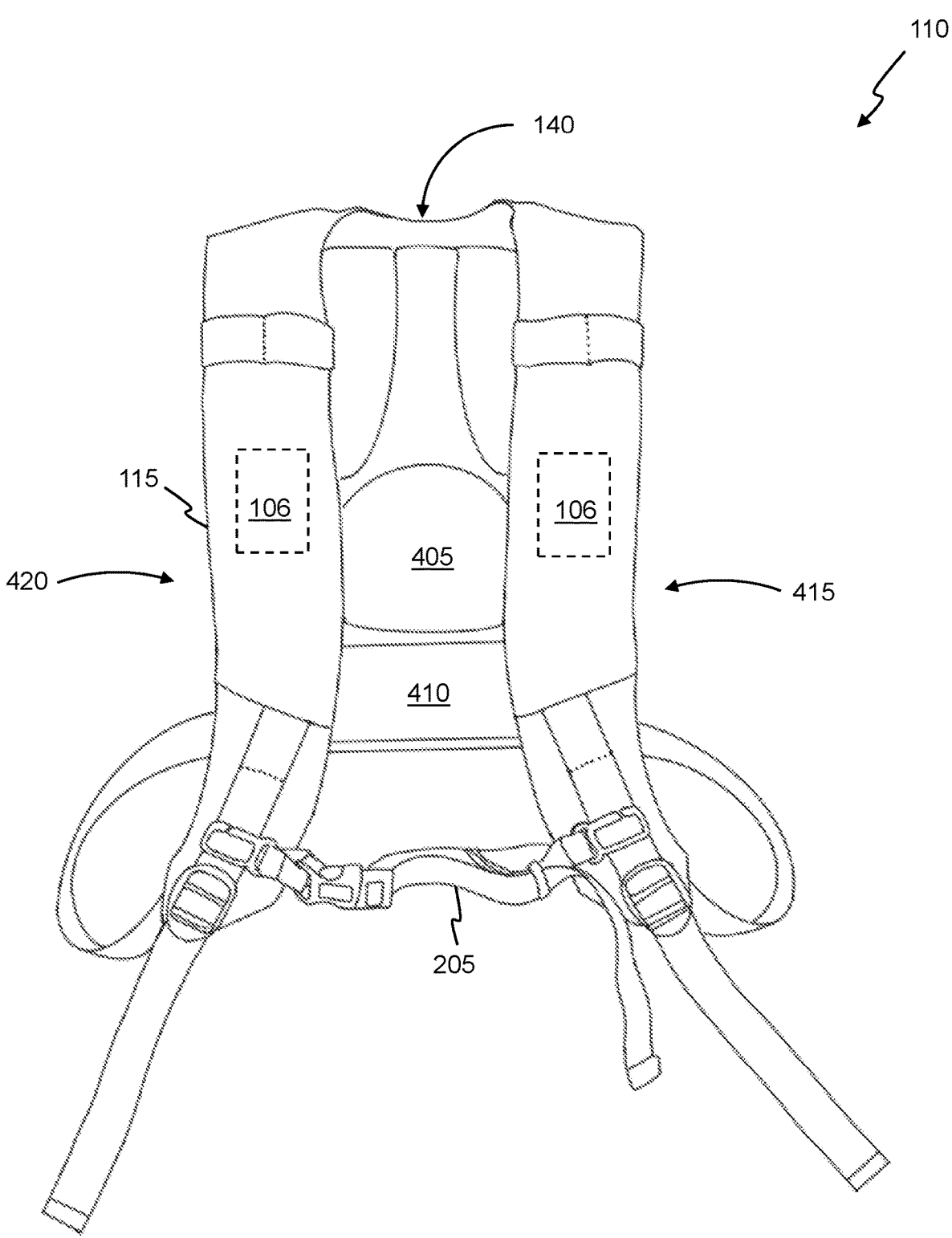
FIG. 4 illustrates a rear view of view of the WCN, in accordance with certain embodiments.
Figure 5:
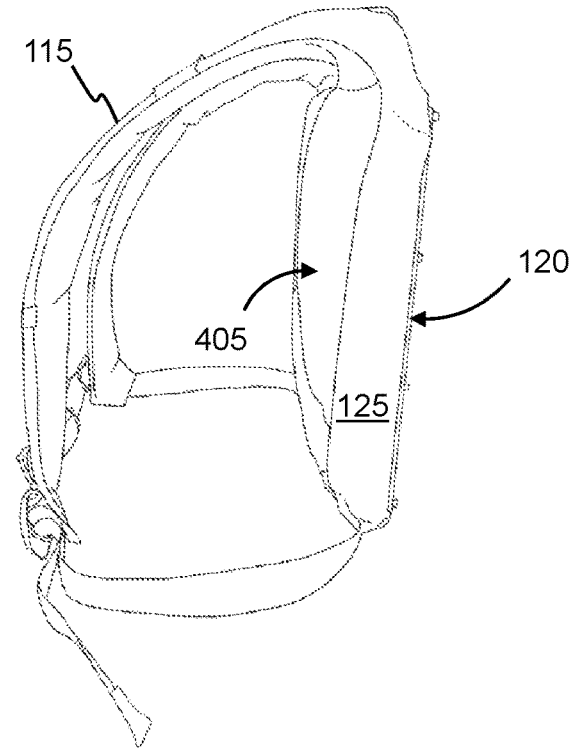
FIG. 5 illustrates a left view of the WCN, in accordance with yet still other embodiments.
Figure 6:
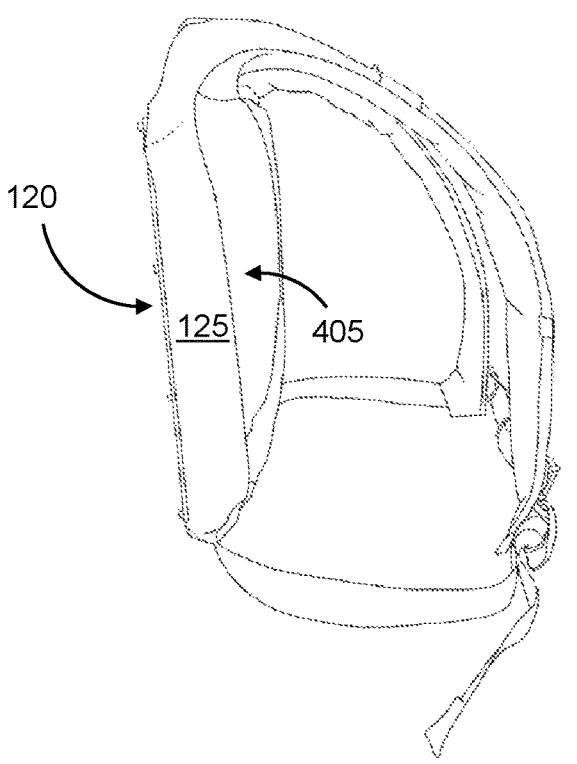
FIG. 6 illustrates a right view of the WCN, in accordance with some embodiments.
Figure 7:
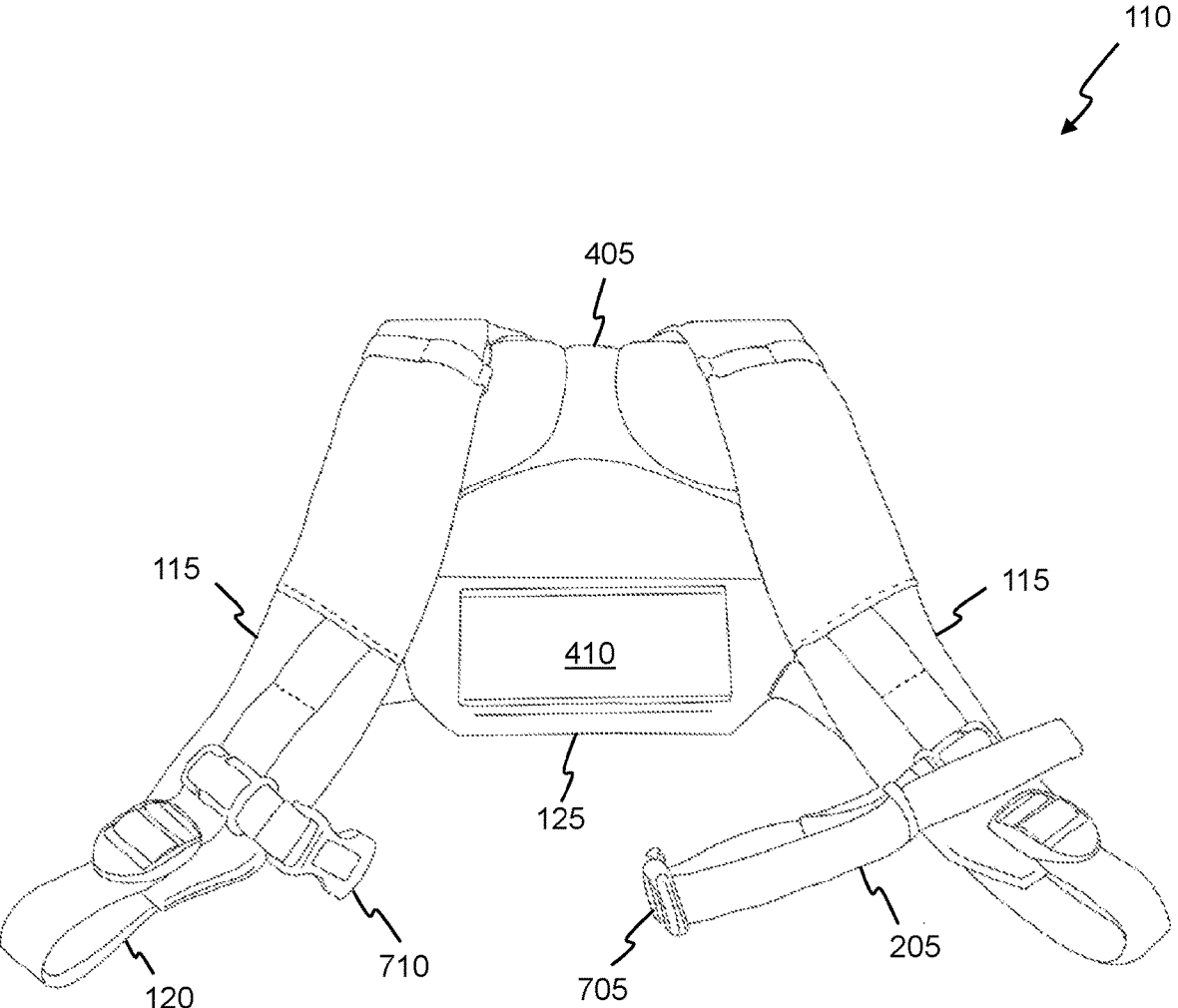
FIG. 7 illustrates a bottom view of the WCN, in accordance with other embodiments.
Figure 8:
FIG. 8 illustrates a top view of the WCN, in accordance with certain embodiments.
Figure 8:
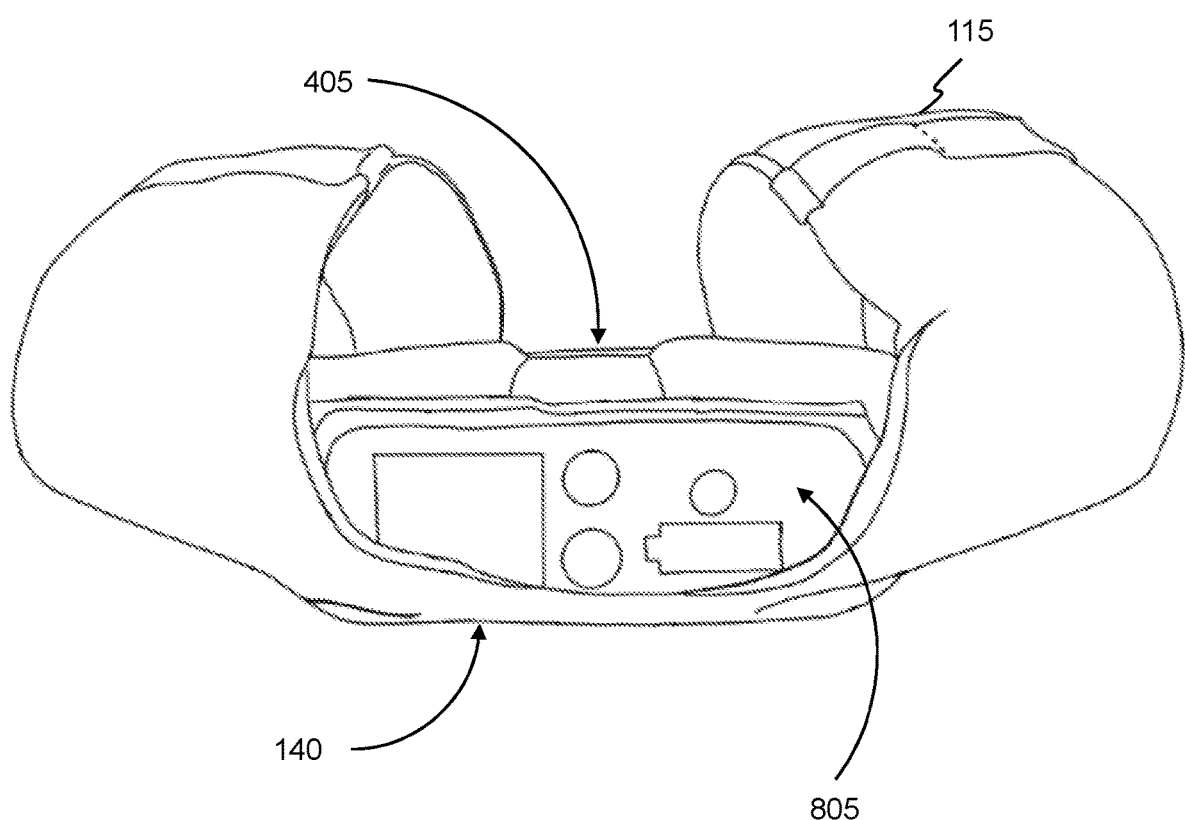
Figure 9:
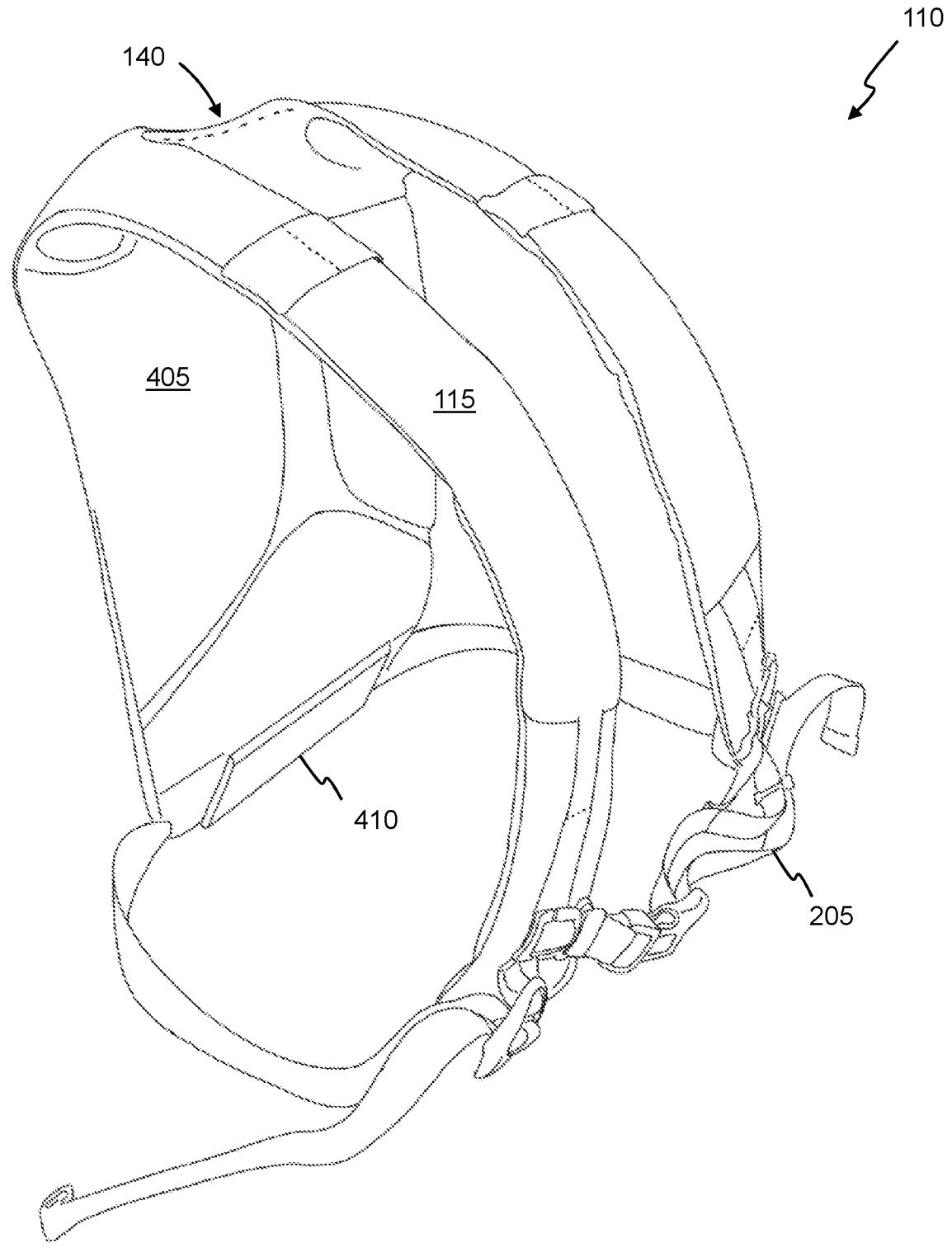
FIG. 9 illustrates a rear perspective view of the WCN, in accordance with yet still other embodiments.
Figure 10:
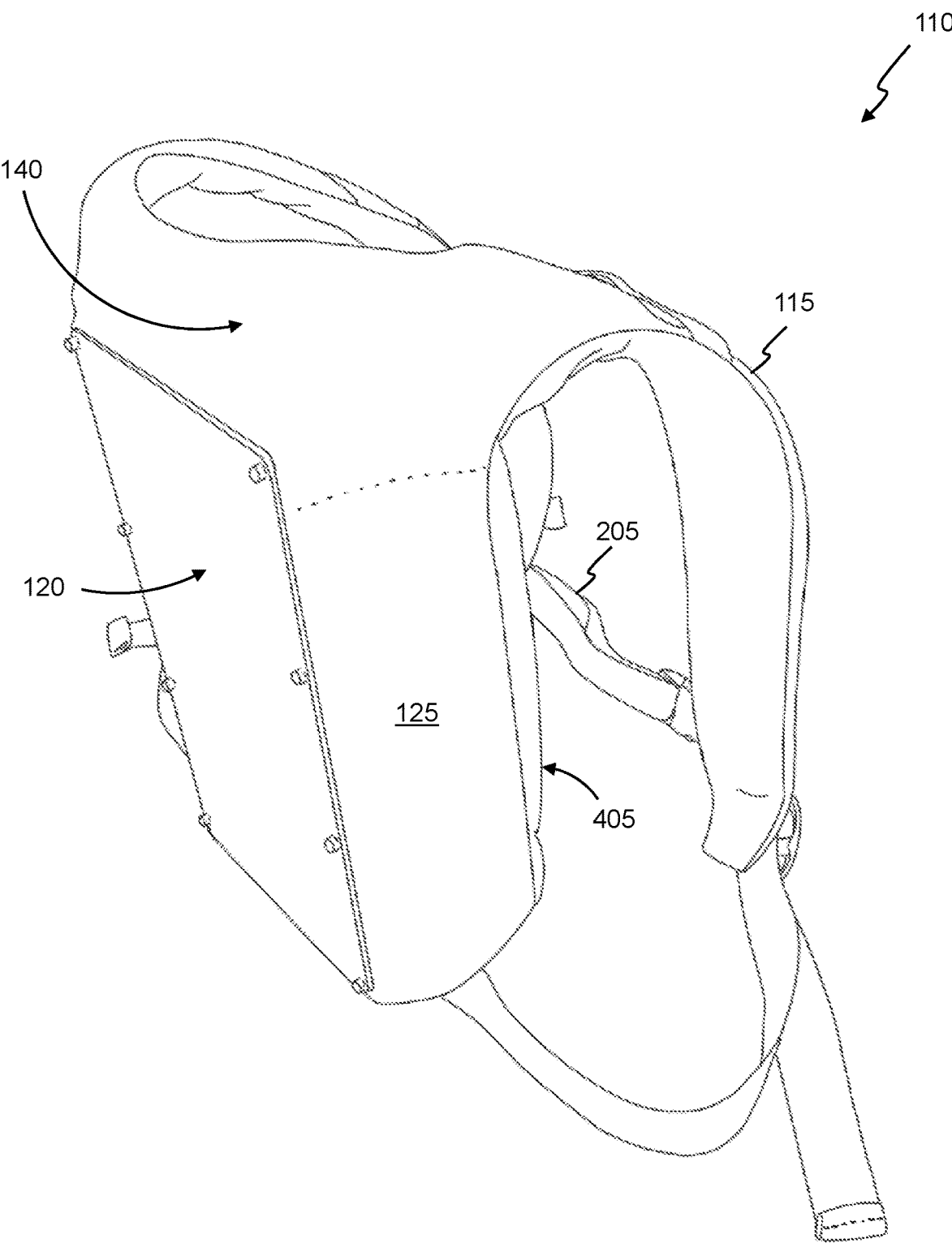
FIG. 10 illustrates a front view of the WCN, in accordance with some embodiments.

In the example illustrated in FIG. 1A, each mesh network 10 has an access point 16 connected to a higher bandwidth communication resource such as a Wide Area Network (WAN) base station 18 via a first tier backhaul link 20. The backhaul links 20 may be formed using a conventional point-to-point or point-to-multipoint wireless or wireline technology. In either instance, there is a single path from each access point 16 to the WAN base station 18. In the example shown in FIG. 1B, the WAN base station 18 is connected via second tier wired or wireless backhaul link(s) 22 to further networking equipment, such as a central office 24. Due to the large number of first tier backhaul links 20, the full capacity of the first tier backhaul links may not be utilized. Indeed, depending on network architecture, the first tier backhaul links may be required to carry as little as 5% of their available capacity to prevent the call blocking ratio on the secondary backhaul link 22 from becoming onerous. This underutilization of the first tier backhaul links represents an over-provisioning in the first tier backhaul network which is necessary, given the limited geographical range of the mesh networks 10 being served by the first tier backhaul links 20.

Hand-held (i.e. portable) communications systems, such as walkie-talkies and other portable radio transceivers, are used by military personnel, law enforcement officials, first responders, as well as civilians. However, such systems typically utilize one or more conspicuous antennas, such as whip antennas, which typically consist of a straight flexible metal wire or rod embedded in polymer material. The bottom end of whip antennas are communicatively coupled to the transceiver of the handheld communications system. Whip antennas are typically designed to be flexible to reduce breaking. However, such antennas are increasingly deployed in environments where identification of the communications personnel and/or their locations may not be desired (e.g., military theaters and clandestine operations). Even more, such antennas are typically vulnerable to entanglement in foliage or debris, and damage in disaster and emergency, as well as high population density environments.

The instant disclosure relates generally to communications nodes and specifically to wearable communications nodes (hereinafter "WCN") and drop nodes with mesh networking capabilities. The instant disclosure seeks to provide WCNs that include antenna elements that have a reduced visual signature. The instant disclosure further seeks to provide antenna elements that are flexible and foldable and can substantially conform to the contours of the user without a statistically significant (e.g., greater than 0.5 dB) loss in performance. The instant disclosure further seeks to provide a RF locating system ("RFLS") that utilizes the aforementioned communications nodes and their received signal strength indicator measurements to determine the position of a RF source of interest relative to the RFLS. In addition, the instant disclosure seeks to provide communication nodes in the form of man portable node for use in outdoor rugged environments ("drop node").

Real-time locating systems ("RTLS"), also known as real-time tracking systems, are used to automatically identify and track the location of objects or people in real time, usually within a building or other contained area. Wireless RTLS tags are typically attached to objects or worn by people, and in most RTLS, fixed reference points receive wireless signals from tags to determine their location. Examples of real-time locating systems include, but are not limited to, tracking automobiles through an assembly line, locating pallets of merchandise in a warehouse, or finding medical equipment in a hospital. However, in light of the ubiquity of mobile communications devices, there is a need to track and locate any persons and objects that transmit RF signals. To be sure, the popularity of mobile communications devices (e.g., cell phones, walkie-talkies, tablet computing devices, and similar devices) has fostered a growing interest in location-aware systems and services.

A key distinguishing feature of such systems is that the application information and/or interface presented to the user is, in general, a function of their physical location. The granularity of location information needed could vary from one application to another. For example, locating a nearby RF source of interest in an empty warehouse requires fairly coarse-grained location information whereas locating the same RF source of interest in an office building with other RF sources would require fine-grained information. Therefore, users would benefit from an RF-based system for locating and tracking RF sources of interest inside as well as outside buildings.

The instant disclosure will now be described in detail with reference to the Figures. Embodiments of the present invention will now be described in detail with reference to the Figures. FIGS. 1B-10 illustrate a WCN 110 as worn by a user 101 as well as in various views (e.g., front, rear, side, perspective, etc.). Note that for three and two digit reference numbers the first and first two digits, respectively, reflect the Figure in which the element was first depicted. The WCN 110 is a wearable communications device with embedded antenna elements and mesh networking capabilities. As reflected in FIGS. 1B and 2, the WCN 110 includes at least one shoulder strap 115 pivotably attached to an enclosure 125, which allows the WCN 110 to be worn by the user 101. In other words, the WCN 110 is configured to be worn on the torso of the user 101. A shoulder area 102 of the user 101 is also depicted.

The enclosure 125 (and hence, the WCN 110) includes a top area 305 (positioned proximate the neck/head area of the user 101), a bottom area 310 (positioned proximate the lower back area of the user 101), a left side 415, a right side 420, a front panel 130, and a back panel 405. These components as well as the shoulder strap 115 are ideally fabricated using textile materials. A primary requirement of the WCN 110 water-resistance to IP65 or higher. Applicable textile materials should be flexible enough to conform to the contours of the user 101 as well as a housing 1300 and include, but are limited to, water-proof textiles, textiles that can be water-proofed using a chemical solution known in the art, foams, functional textiles (e.g., EMI shielding layers) and similar textile materials. For example, canvas waterproof oxford fabrics, denier, polyester, Cardura 500, and similar waterproof fabrics. To be sure, the bottom area 310 is positioned opposite the top area 304 and the left side 415 is positioned opposite the right side 420.

The front panel 130 and the back panel 405 are peripherally affixed together via bonding (e.g., via polymer adhesive, heat, pressure, other bonding techniques or a combination of two or more thereof), sewing, use of fasteners (e.g., screws, staples, bolts), or a combination of two or more thereof to each other to achieve a protection of IP65 or higher. IP Code or Ingress Protection Code is defined in IEC 60529 which classifies and provides a guideline to the degree of protection provided by mechanical casings and electrical enclosures against intrusion, dust, accidental contact, and water. The first digit indicates the level of protection that the enclosure provides against access to hazardous parts (e.g., electrical conductors, moving parts) and the ingress of solid foreign objects. Here, a level sized "6" indicates no ingress of dust and a complete protection against contact (dust-tight).

The second digit indicates the level of protection that the enclosure provides against harmful ingress of water. Here, level "5" indicates that protection against at least water jets for 1 minute per square meter for at least 3 minutes at a water volume of 12.5 liters per minute and a pressure of 30 kPa (4.4 psi) at a distance of 3 meters (9.8 ft.). The front panel 130 and the back panel 405 are further affixed to a front portion 1605 and a rear portion 1515, respectively, of a housing 1300 (as reflected in FIGS. 13-21 and described in further detail below) via bonding (e.g., via polymer adhesive, heat, pressure, other bonding techniques or a combination of two or more thereof), sewing, use of fasteners (e.g., screws, staples, bolts), or a combination of two or more thereof to each other to achieve a protection of IP65 or higher. The shoulder straps 115 are each pivotably attached proximate to a corner of the enclosure 125. A least one antenna element 106 is affixed to at least one of the enclosure 125 and the shoulder strap 115.

As reflected in FIGS. 2-5 and 8, the enclosure 125 includes an overlap element 140 that horizontally extends between the shoulder straps 115 and vertically extends from the top area 305 and at least partially shields the control panel 805 of a housing 1300 (discussed below) from view when the WCN 110 is worn by the user 101. Specifically, when the shoulder straps 115 are worn on the shoulder of the user 101, the shoulder straps 115 orient the overlap element 140 towards the upper back of the user 101 and thereby help to shield the control panel 805 from the view of others. To be sure, the shoulder strap 115 can include multiple textile layers positioned on each other or simply one textile layer that can maintain structural integrity despite the load of the enclosure 125 that weighs thereon. Alternatively, the shoulder strap 115 can replaced via D-rings, loops, webbing, hook-and-loop, or other attachment points that allow the WCN 110 to be demountably attached to a backpack, plate carrier, or other compatible objects and apparel items. For example, such attachment points can be made of metal, polymers, Paracord, elastic, and/or cording.

Figure 11:
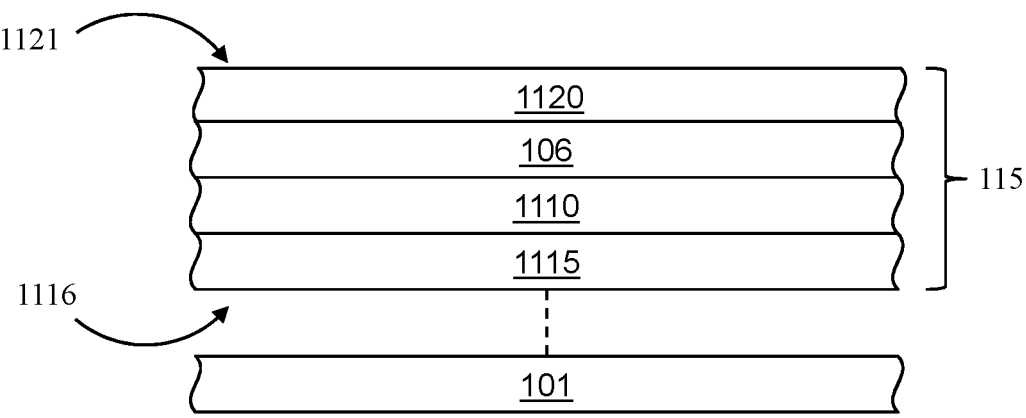
FIG. 11 illustrates a cross-section of a shoulder strap of the WCN positioned near a user, in accordance with other embodiments.

For example, embodiments that include an antenna element 106 positioned in or on the shoulder strap 115, the shoulder strap 115 can include EMI shielding materials (e.g., foils, meshes, foams, conductive textiles) positioned between the user 101 and the antenna element 106 to thereby at least partially shield the user 101 from EM radiation that emanates from the antenna element 106 away from the user surface (i.e. the user 101). FIG. 11 illustrates a cross-section of the shoulder strap 115 positioned near the user 101, in accordance with other embodiments. Here, the shoulder strap 115 includes a plurality of layers; namely, a front strap panel 1120, a rear strap panel 1115, the antenna element 106, and an EMI shielding layer 1110. In embodiments that the shoulder strap 115 does not include an antenna element 106, the shoulder strap 115 can be include just one panel. In certain embodiments, the housing 1300 includes the aforementioned attachment points positioned on its exterior to allow for direct demountable attachment to a backpack, plate carrier, or other compatible objects, structures, and/or apparel items.

The shoulder strap 115 includes a front strap panel 1120 and a rear strap panel 1115 peripherally affixed together to thereby form a layered structure in which the antenna element 106 (and possible additional layers) is positioned. In other words, the antenna element 106 is positioned between the front strap panel 1120 and the rear strap panel 1115. Note the layered structure has a protection of IP65 or higher to ensure protection of the antenna element 106. When the WCN 110 is worn, an external surface 1116 of the rear strap panel 1115 is positioned proximate to and oriented towards the user 101. Similarly, an external surface 1121 of the front strap panel 1120 is oriented away from the user 101. At least the EMI shielding layer 1110 is positioned between the rear strap panel 1115 and the antenna element 106 to thereby reflect EM radiation that emanates from the antenna element 106 away from the user 101. For example, a foam textile layer may also be positioned therebetween to increase user comfort.

Turning now to the internal electrical components of the WCN 110. FIG. 13 depicts a block diagram of the WCN 110, in accordance with yet still other embodiments. The WCN 110 includes the housing 1300 rigidly affixed (e.g., via bonding, screws, staples, bolts, and/or similar fasteners) within the enclosure 125. The housing 1300 protects the electrical components of the WCN 110 against water, dust, particles to a protection of IP65 or higher. As reflected in FIGS. 14A-16A, the housing 1300 is a rigid and hollow structure (e.g., made of polymer, such as Nylon, PLA, ABS, resin, or other non-electrically conductive thermally stable material) that includes a front portion 1605, a rear portion 1515, a top end 1405, a bottom end 1410, and angular sides 1140. The front portion 1605 is oriented away from and positioned distal to the user 101. The rear portion 1515 is oriented towards and positioned proximate the user 101. The top end 1405 is positioned proximate to a shoulder area of the user 101. The bottom end 1410 is positioned distal to the shoulder area and opposite the top end. The housing 1300 includes an opening 1415 that is positioned on the front portion 1605 that allows access to an internal environment 1420. The housing 1300 can be manufactured using additive manufacturing, molding, milling, casting, and similar manufacturing processes. Although the housing 1300 is depicted as a single unit, the housing 1300 can include multiple components that are pieces together to form the final product depicted in the figures.

The internal environment 1420 includes one or more of a charging port 1330, an output device 1325, a battery 1315, a communications device 1305, a geolocation device 1320, an audio port 1350, and a video port 1335 each conductively coupled to a control circuit 1310. To be sure, the control circuit 1310 can be multiple control circuits that work together to perform one or more steps, processes, and/or functions disclosed in the instant application. The control circuit 1310 can include two or more processing cores that operate as separate processors therein; however, all processing cores may not be active unless needed. Here, the control circuit 1310 can execute code using the processing cores at different stages of execution. The control circuit 1310 can independently execute two or more instructions threads using the same process resources. In this manner, the control circuit 1310 can be used to speed computational processes (e.g., for machine learning, artificial intelligence, or similar functionality). In other words, the WCN 110 can perform one or more tasks, functions, and/or processes using AI algorithms.

Artificial intelligence (AI) is the science and engineering of making intelligent computer programs. It is related to the similar task of using computing devices to understand human intelligence, but AI does not have to confine itself to methods that are biologically observable. At its simplest form, artificial intelligence is a field, which combines computer science and robust datasets, to enable problem-solving. It also encompasses sub-fields of machine learning and deep learning, which are frequently mentioned in conjunction with artificial intelligence. These disciplines are comprised of AI algorithms which seek to create expert systems which make predictions or classifications based on input data. Machine learning methods build models based on sample data, known as "training data," to generate predictions or decisions without being explicitly programmed to do so.

Applicable machine learning methods include, but are not limited to, supervised learning, unsupervised learning, and reinforcement learning. Not to be limited by theory, supervised learning refers to machine learning approaches where the WCN 110 is presented or "trained" with exemplary inputs and their desired outputs ("training data") and thereby determines a rule ("determined rule") that maps inputs to outputs. Each training example has one or more inputs and the desired output, also known as a "supervisory signal." In the mathematical model, each training example is represented by an array or vector, sometimes called a "feature vector," and the training data is represented by a matrix. Through iterative optimization of an objective function, supervised learning algorithms learn a function that can be used to predict the output associated with new inputs.

Types of supervised-learning algorithms include active learning, classification and regression. Classification algorithms are used when the outputs are restricted to a limited set of values, and regression algorithms are used when the outputs may have any numerical value within a range. For example, for classification algorithms that identify chemical vapor signatures, physical objects, and RF spectrum, the training data includes predetermined (i.e. known or pre-classified) chemical signatures, physical object images, and RF spectrum trace data, respectively, as well as their predetermined identifications, for example, carbon monoxide, hand, and primary user presence, respectively.

Unsupervised learning algorithms take a set of data that contains only inputs, and find structure in the data, like grouping or clustering of data points. The algorithms, therefore, learn from test data that has not been labeled, classified or categorized. Instead of responding to feedback, unsupervised learning algorithms identify commonalities in the data and react based on the presence or absence of such commonalities in each new piece of data. Reinforcement learning is an area of machine learning concerned with how software agents ought to take actions in an environment so as to maximize some notion of cumulative reward. Due to its generality, the field is studied in many other disciplines, such as game theory, control theory, operations research, information theory, simulation-based optimization, multi-agent systems, swarm intelligence, statistics and genetic algorithms. In machine learning, the environment is typically represented as a Markov decision process ("MDP"). Many reinforcement learning algorithms use dynamic programming techniques. Reinforcement learning algorithms do not assume knowledge of an exact mathematical model of the MDP, and are used when exact models are infeasible. Reinforcement learning algorithms are used in autonomous vehicles or in learning to play a game against a human opponent.

Rapid computational processing allows the control circuit 1310 to engage in edge processing when the WCN 110 operates in a distributed computing environment (e.g., the WAN 2230 discussed below). "Edge processing" refers to the execution of aggregation, data manipulation, bandwidth reduction and other logic directly on the control circuit 1310 (i.e. the WCN 110) as opposed to receiving said logic from another computing device and responding to the logic. In other words, the WCN 110 can analyze captured data and respond to the analysis without the need to transmit the capture data and/or analysis to receive the response.

The control circuit 1310 can be any control circuit known in the art capable of performing one or more steps, processes, and/or functions disclosed in the instant application (e.g., microcontrollers, microprocessors, embedded processors, digital signal processors, media processors, application-specific processors, application-specific instruction set processors, ASIC processors, etc.). Each of the aforementioned components are rigidly affixed within the internal environment 1420 (i.e. the housing 1300). The battery 1315 includes one or more electrochemical cells to generate electrical energy. The battery 1315 can be a primary or a secondary battery. As a secondary battery, the battery 1315 can be recharged via connecting an external power source to the WCN 110 via the charging port 1330.

The charging port 1330 is a physical connector known in the art that mates with another connector (usually a type of plug on the end of a cable) to electrically connect the WCN 110 to an external power source (e.g., an electrical outlet, portable electric generator, battery pack, and similar external power sources known in the art). In certain embodiments, the WCN 110 includes an inductive charging element to facilitate wireless power transfer. The control panel 1430 is a flat area that includes control instruments and interface elements. Although the control panel 1430 is depicted as positioned on or proximate to the top end 1405, the component can be positioned at or proximate to other locations on the housing 1300 (e.g., the side or the bottom end 1410. The control panel 1430 allows access to an output device 1325*a* (e.g., a battery power indicator LED), an output device 1325*b* (e.g., a network status indicator LED), the audio port 1350, the video port 1335, the charging port 1330, and a power switch 1905. Note, the battery power indicator LED can convey the percentage of power that remains in the battery (e.g., 10%, 25%, etc.) and/or a low power status.

The communications device 1305 is one or more computing devices that work together to wirelessly transmit and receives information (i.e. data) using a wireless communications protocol known in the art or compatible with an embodiment of the instant disclosure. In other words, the communications device 1305 allows the WCN 110 to establish a communications network (e.g., a mesh communications network) with one or more other devices (e.g., the WCNs 110 as well as other communications devices with and/or without mesh networking capabilities). In certain embodiments, the communications device 1305 includes a plurality of devices that work together to perform one or more communications tasks disclosed in the instant application. The communications device 1305 is conductively coupled to and preferably communicates via one or more antenna elements 106 (e.g., send and/or receive data modulated via one or more communications protocols known in the art).

The communications device 1306 can communicate via one or more communication protocols known in the art (or compatible therewith) that include, but are not limited to, UHF, VHF, Long-Term Evolution ("LTE"), 3G, standards based on GSM/EDGE and/or UMTS/HSPA, Wi-Fi, IEEE 802.11 standards, General Packet Radio Service ("GPRS"), local area networking ("LAN") protocols, ("WAN") wide area networking protocols, Bluetooth®, microwave, and similar wireless communications protocols. The control circuit 1310 is configured to establish, via the communications device 1306, a self-organizing wide area network ("WAN") with a plurality of computing devices (e.g., other WCN 110 as well as other communications devices) that each connects directly, dynamically, and non-hierarchically to the WAN (i.e. establish a mesh network).

The antenna element 106 is an electrically conductive object that is utilized via the communications device 1305 to wirelessly transmit and receive information (i.e. radio waves), according to preferred embodiments. The antenna element 106 preferably substantially conforms to the contours of the torso of the user 101. In order to do so, the antenna element 106 is preferably a planar, flexible, and bendable structure that has a reduced visual signature (e.g., less than 2 mm thick). The antenna element 106 can be an antenna array (e.g., a plurality of antenna elements 106 interconnected to work together as a single antenna to transmit or receive radio waves). For example, the antenna array can be configured as a phased array to enable directional RF signal transmission or reception. The antenna element 106 is formed (e.g., via printing, molding, coating, and similar deposition techniques) using a conductive composition that includes a polymer(s) and fully exfoliated single sheets of graphene.

The fully exfoliated single sheets of graphene preferably form a three-dimensional percolated network within the polymer(s), which yields superior conductivity for the composition compared to un-percolated compositions that may rely more on the conductivity of the polymer and/or an electrically conductive addictive. The fully exfoliated single sheets of graphene are separated on a nanoscale within the polymer(s). The fully exfoliated single sheets of graphene are about 1 nm thick and substantially planar. In certain embodiments, the fully exfoliated single sheets of graphene have surface imperfection (i.e. "wrinkles" or "kinks") resulting from the presence of lattice defects in, or by chemical functionalization of the two-dimensional hexagonal lattice structure of the basal plane. Applicable polymers include, but are not limited to, polyethylene terephthalate, acrylic, rayon, aramid, modacrylic, spandex, nylon, olefin, polyester, saran, sulfur, polypropylene, polyethylene, elastane, and similar polymers.

In preferred embodiments, the fully exfoliated graphene sheets (i.e. the graphene sheets) as well as the conductive composition are generated as disclosed in U.S. Pat. No. 7,658,901 B2 by Prud'Homme et al; U.S. Pat. No. 8,278,757 B2 by Crain; US Patent Pub. No. 2011/0189452 A1 by Lettow et al.; and US Patent Pub. No. 2014/0050903 A1 by Lettow et al., which are each hereby incorporated by reference in their entirety. The fully exfoliated graphene sheets preferably have a surface area of about 2,630 m$^2$/g to promote a low percolation threshold of, for example, 0.52 vol. %. To be sure, neither carbon nanotubes (e.g., SWCNT or MWCNT) nor graphite are substitutions of the aforementioned fully exfoliated graphene sheets due the different inherit structural, electrical, and mechanical properties of the materials. For example, the fully exfoliated graphene sheets have a platy (e.g., two-dimensional) structure as opposed to the three-dimensional structure of carbon nanotubes and graphite, which results in higher percolation thresholds.

In other embodiments, the WCN 110 transmits its location data to at least one other WCN 110 in the network. The geolocation device 1320 is one or more electronic devices that operate together to perform a task(s). The geolocation device 1320 can receive information from one or more satellite navigation systems and then calculate the geographical position of the WCN 110. The geolocation device 1320 can measure and report the specific force, angular rate, orientation, and/or heading of the WCN 110. To be sure, the geolocation device 1320 can operate without input from the satellite navigation systems (e.g., similar to IMU-enabled GPS systems and devices). For example, satellite navigation signals are typically unavailable in tunnels, buildings, or when electronic interference is present. Using suitable software the geolocation device 1320 may communicate the position on an output device (e.g., the output device 1325) and it may offer routing directions. The output device 1325 is computer hardware known in the art that communicates information (e.g., stored in the files 1345, received and/or generated via the communications device 1305 or the geolocation device 1320) into a human-perceptible form (e.g., text, graphics, tactile, audio, or video). The output device 1325 is at least partially externally positioned on the enclosure to be viewable by the user without necessitating the user to open the housing 1300 to access the internal environment 1420 (e.g., the control panel).

Figure 13A:
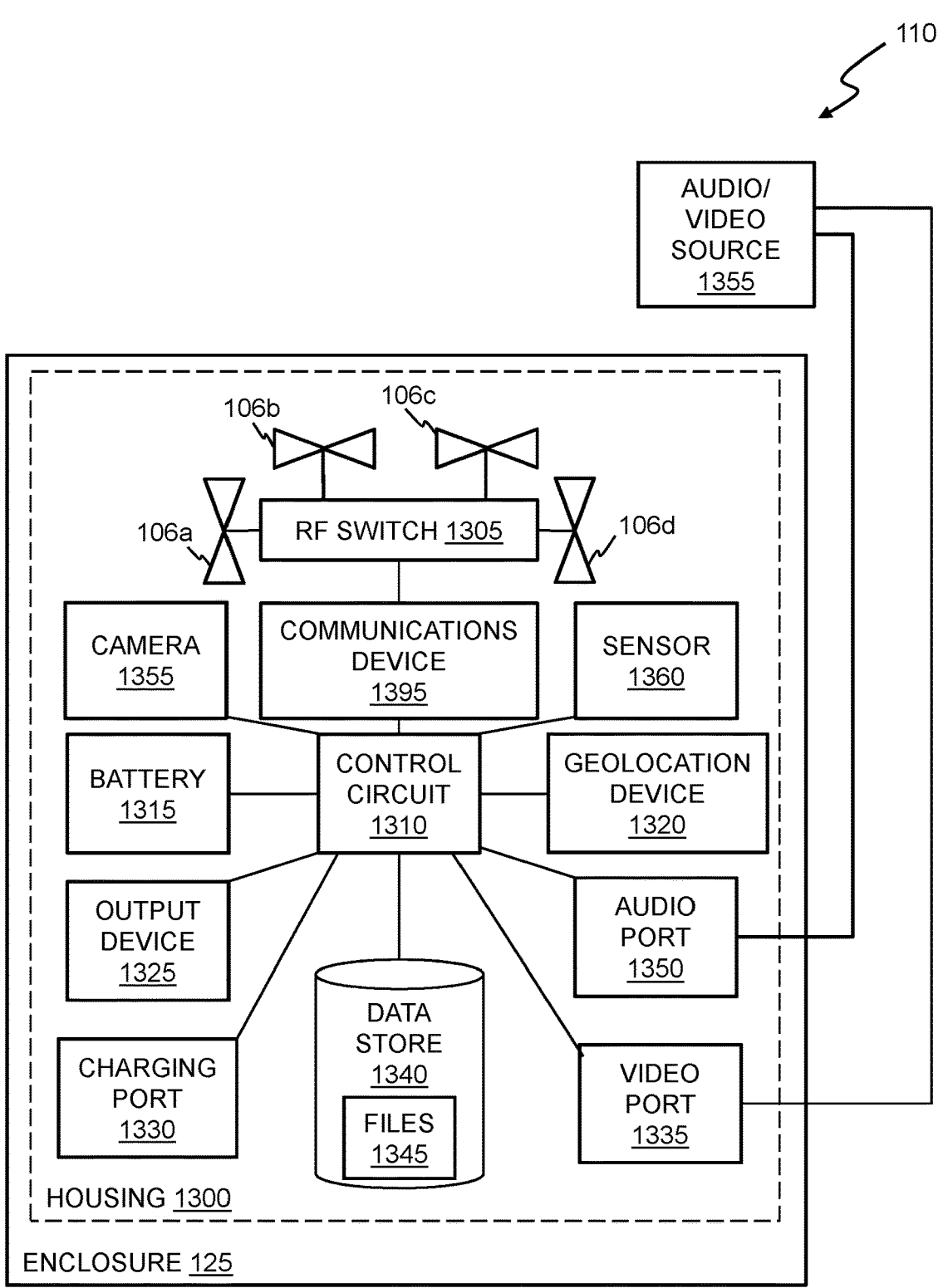
FIG. 13A depicts a block diagram of the WCN, in accordance with yet still other embodiments.
Figure 13B:
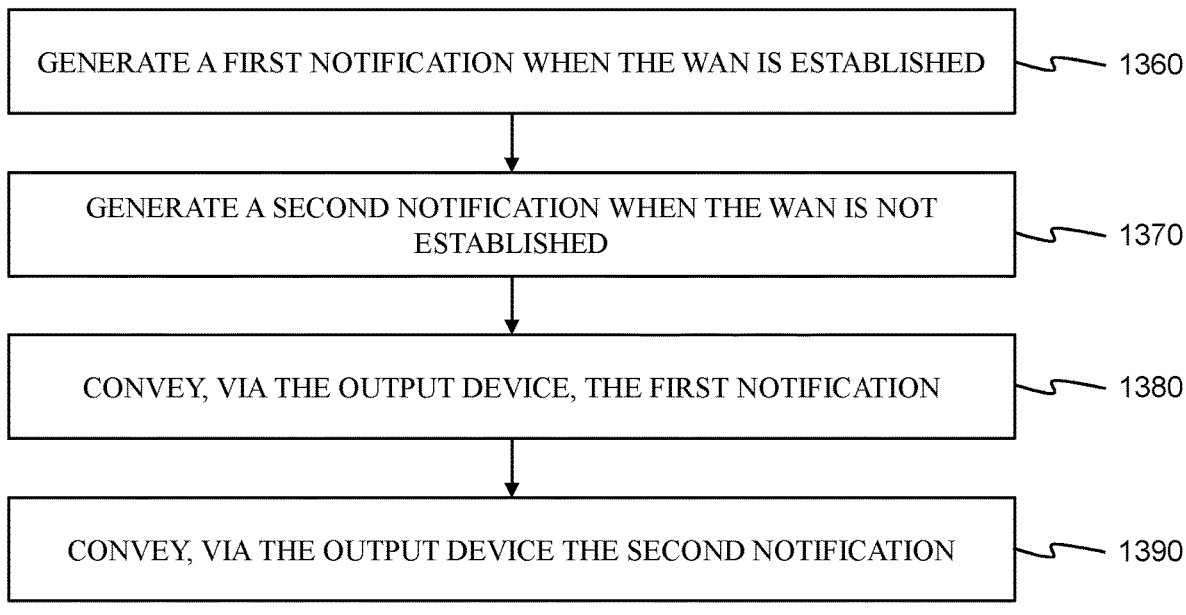
FIG. 13B illustrates the operational of the WCN to generate and convey notifications, in accordance with some embodiments.
Figure 14A:
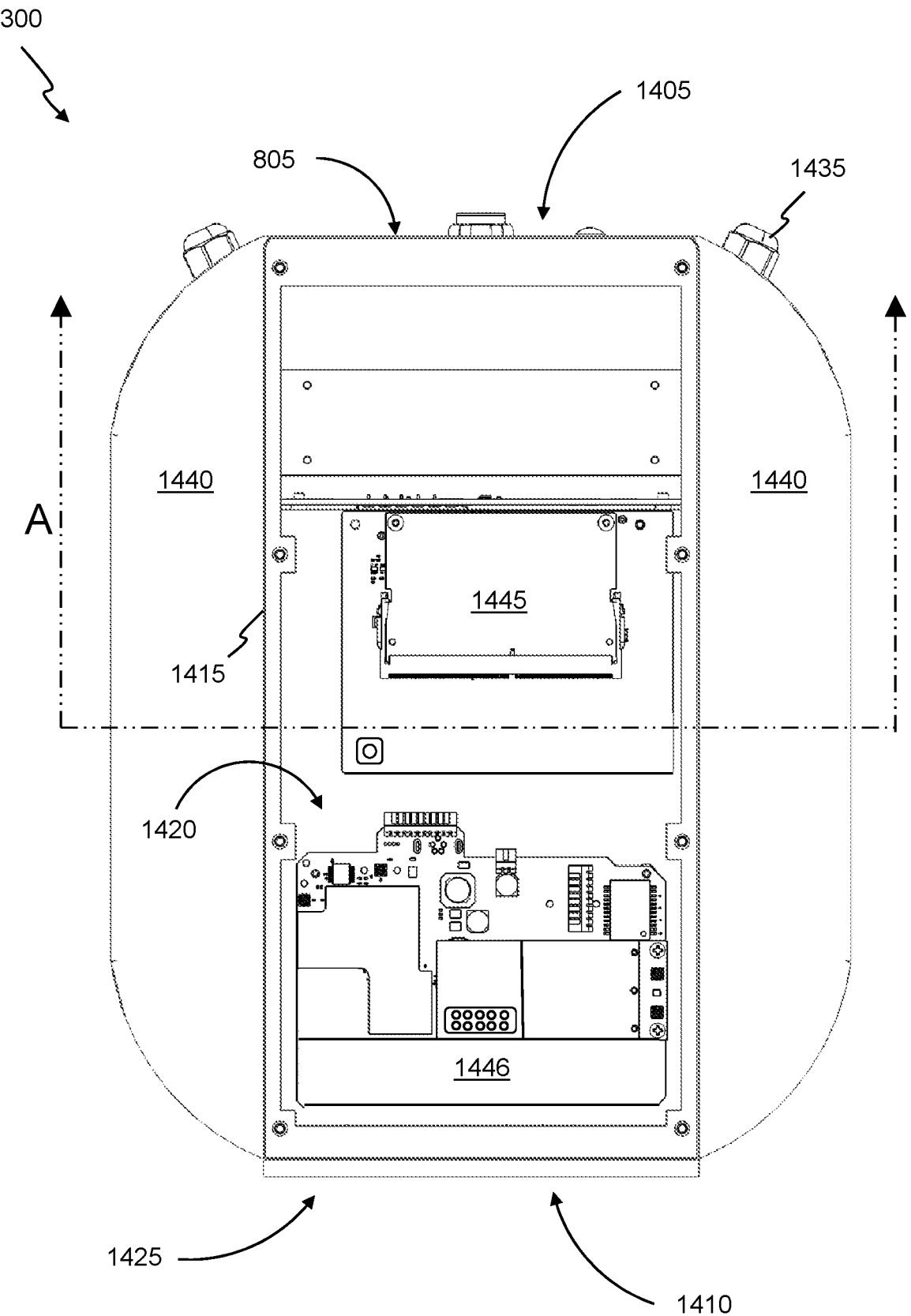
FIG. 14A illustrates a front view of a housing of the WCN, in accordance with some embodiments.
Figure 14B:
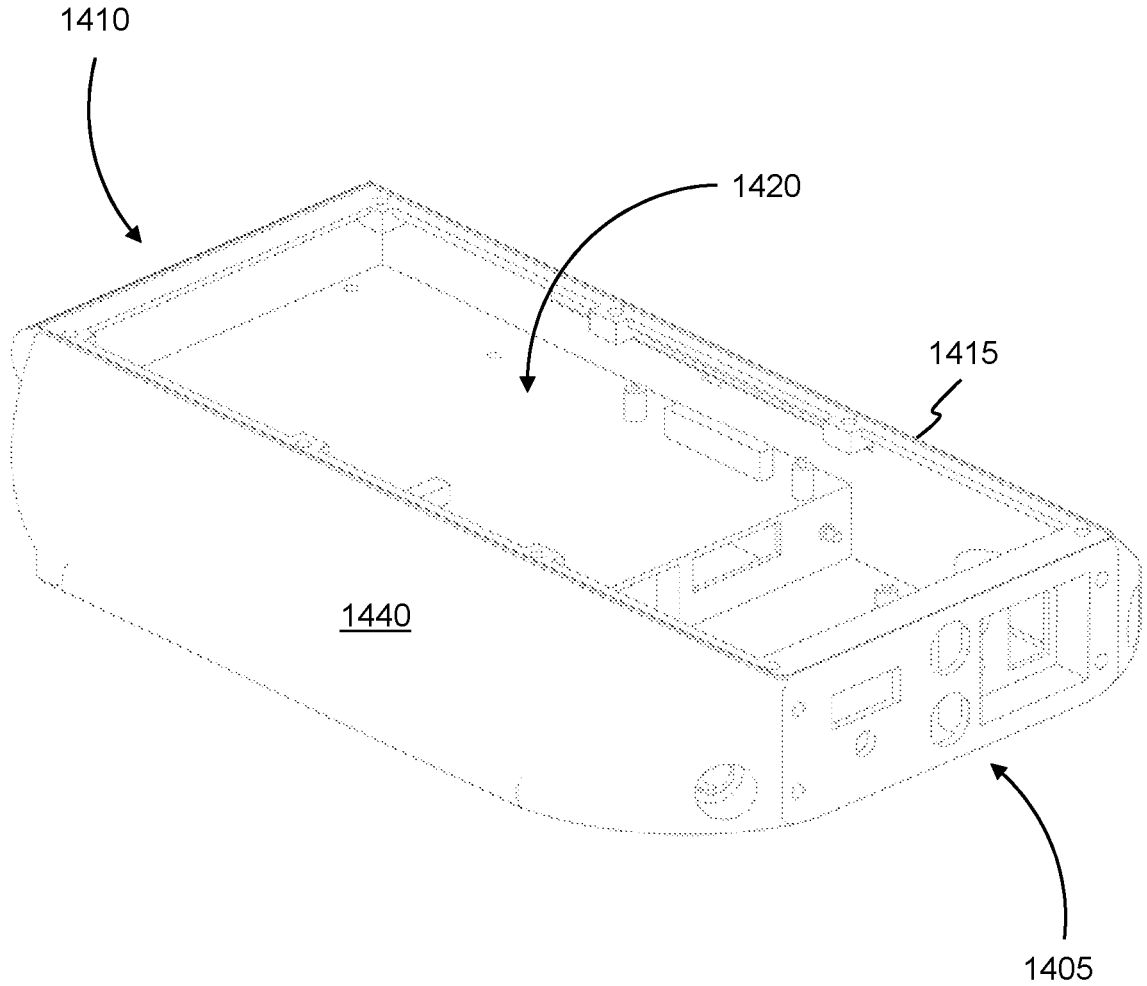
FIG. 14B illustrates a perspective side view of the housing, in accordance with other embodiments.
Figure 15:
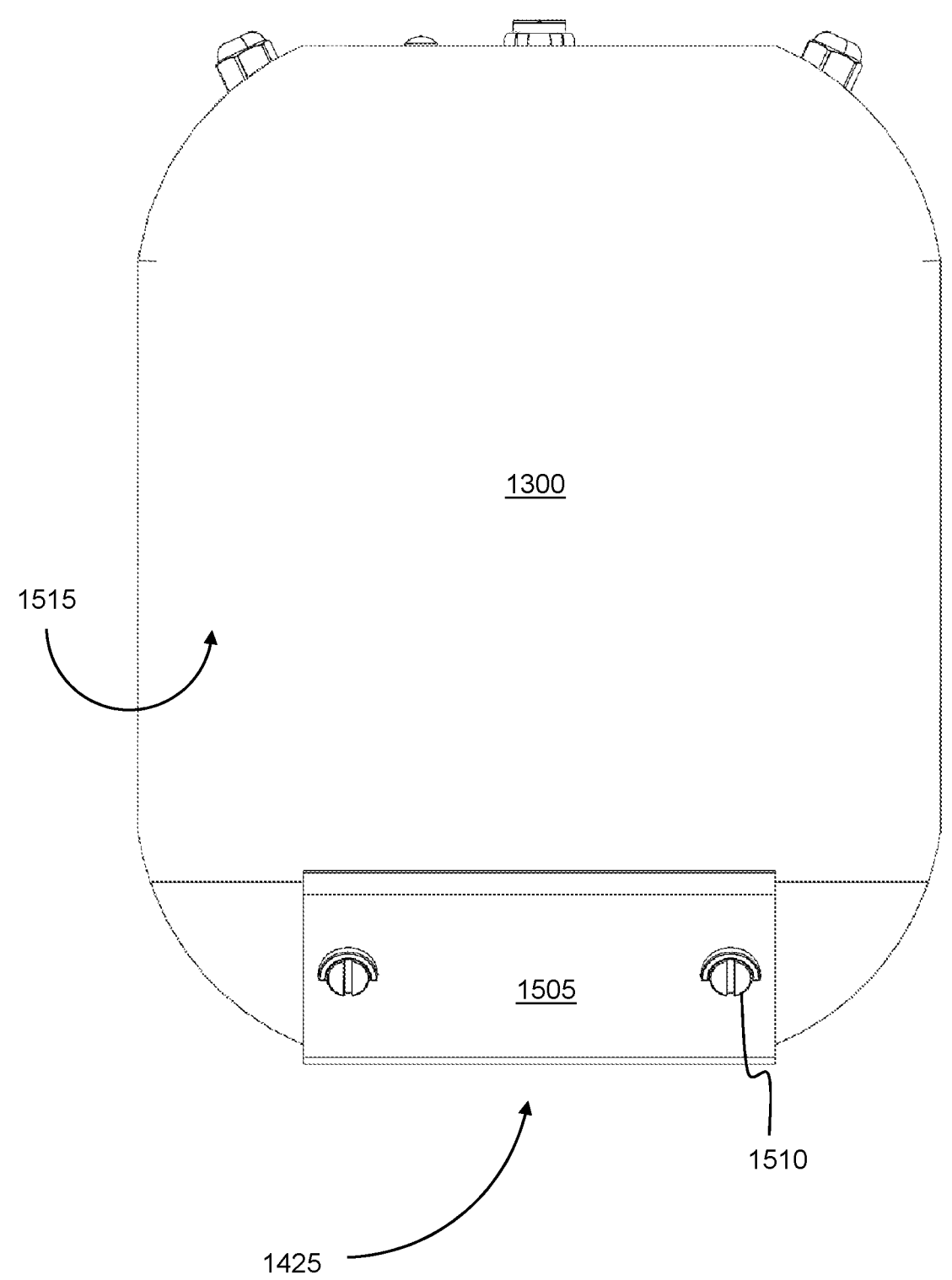
FIG. 15 illustrates a rear portion of the housing, in accordance with other embodiments.

When present, the output device 1325 is communicatively coupled to the control circuit 1310. For example, to operate in extreme conditions (e.g., environments having abnormal temperatures and/or increase probability of physical impact events), the output device 1325 can be a light-emitting diode (LED), which have a low power consumption requirements, long lifetimes, and enhanced physical robustness, and a small footprint. The output device 1325 can be used to convey to the user whether the WCN 110 successfully networked with another copy of the WCN 110. FIG. 13B illustrates the operational steps of the WCN 110 to generate and convey notifications, in accordance with some embodiments. For example, the user 101 activates the WCN 110 and attempts to establish a network (e.g., WAN, wireless mesh network, or similar communications topology) with a computing device (e.g., a WCN 110). At Step 1360, a first notification is generated when the WAN is established.

At Step 1370, a second notification is generated when the WAN is not established. At Step 1380, the first notification is conveyed via the output device 1305. For example, the output device 1325 can be a multicolored light-emitting diode (LED), which is activated to display a first color (e.g., green) to convey that the WAN is established. At Step 1390, the second notification is conveyed via the output device 1305. For example, the output device 1325 can be activated to display a second color (e.g., red) to convey that the WAN is not established. In certain embodiments, the WCN 110 includes a data store 1340 communicatively coupled to the control circuit 1310 that includes a files 1345. Information generated and/or received via the communications device 1305 and/or the geolocation 1320 can be stored in files 1345. To be sure, the data store 1340 is a repository known in the art (or compatible therewith) for persistently storing and managing collections of data which include repositories (e.g., databases and similar data structures) as well as simpler data store types (e.g., simple files, emails etc.).

An audio port 1350 and/or a video port 1335 can be conductively coupled to the control circuit 1310. The audio port 1350 and the video port 1335 are electrical or optical connectors known in the art for carrying audio and video signals, respectively, received from an audio/video source 1355 (e.g., a handheld radio, video camera, computing device that generates audio and/or video signals, communications devices that generates audio and/or video signals, etc.).

Figure 16A:
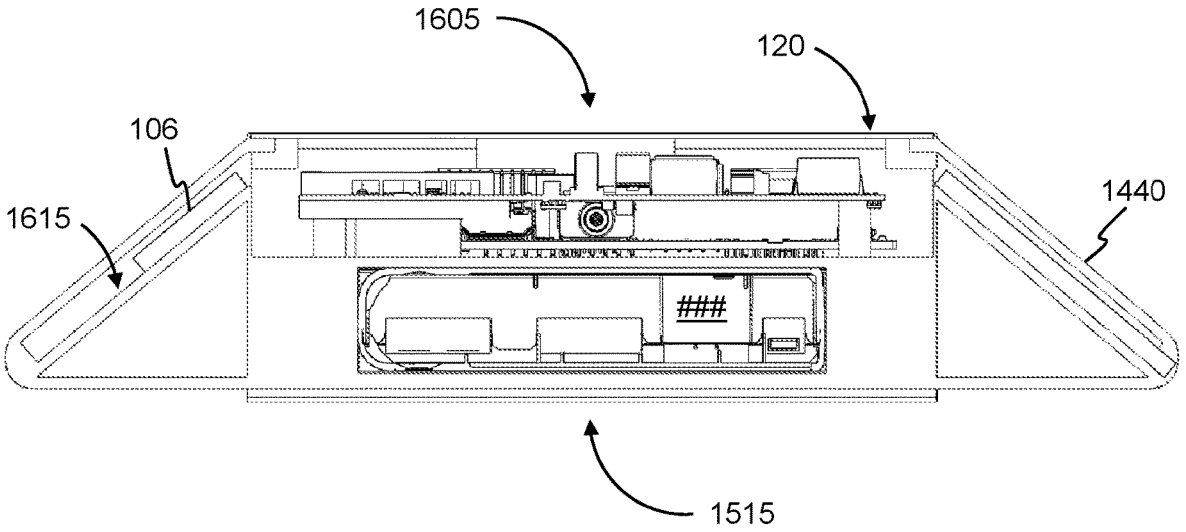
FIG. 16A illustrates a cut-through view of the housing, View A of FIG. 14A, in accordance with certain embodiments.
Figure 16B:
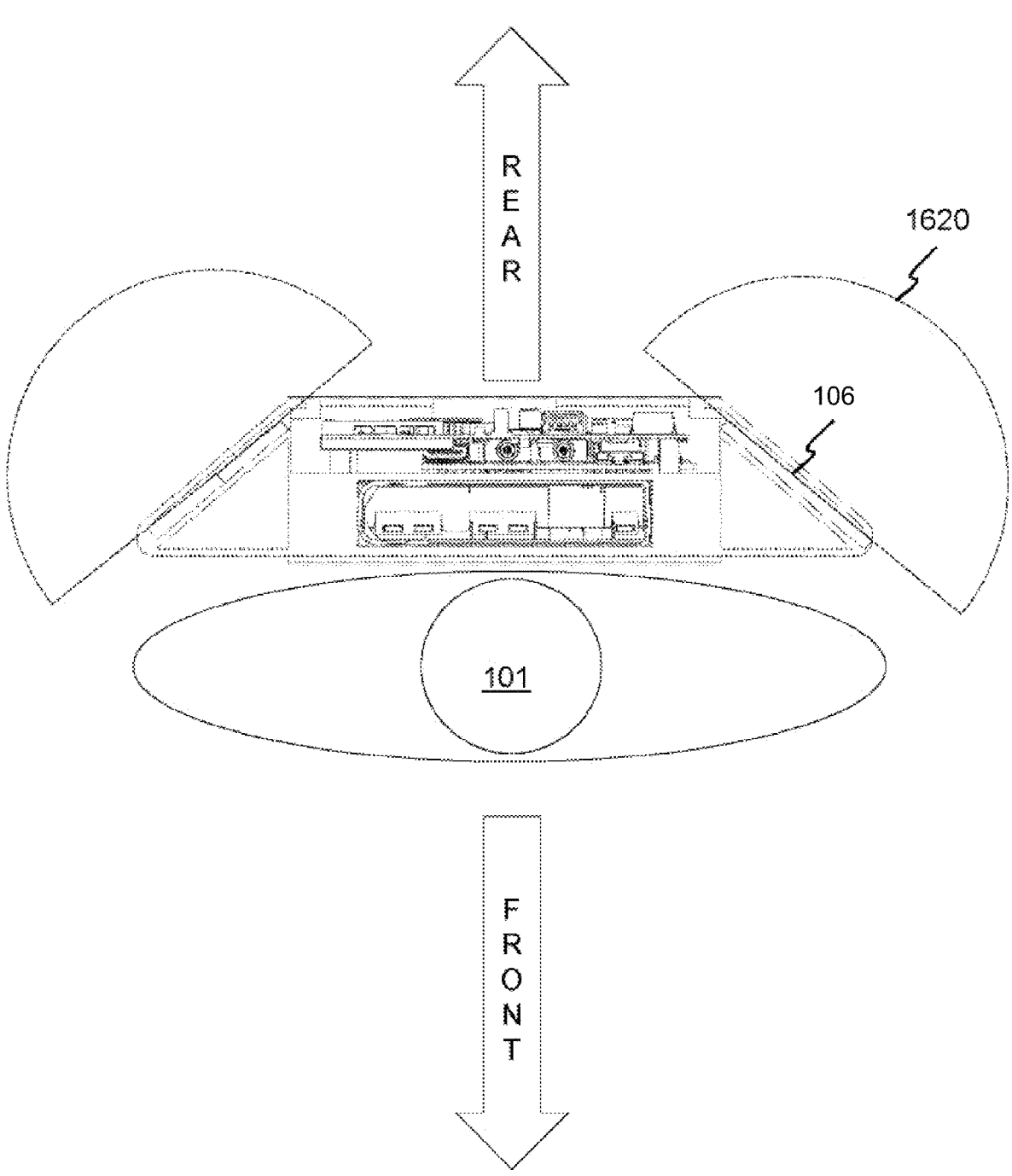
FIG. 16B illustrates a top view of a user wearing the WCN on their back and an associated RF radiation pattern associated with antenna elements oriented at a non-parallel to each other, in accordance with some embodiments.
Figure 16C:
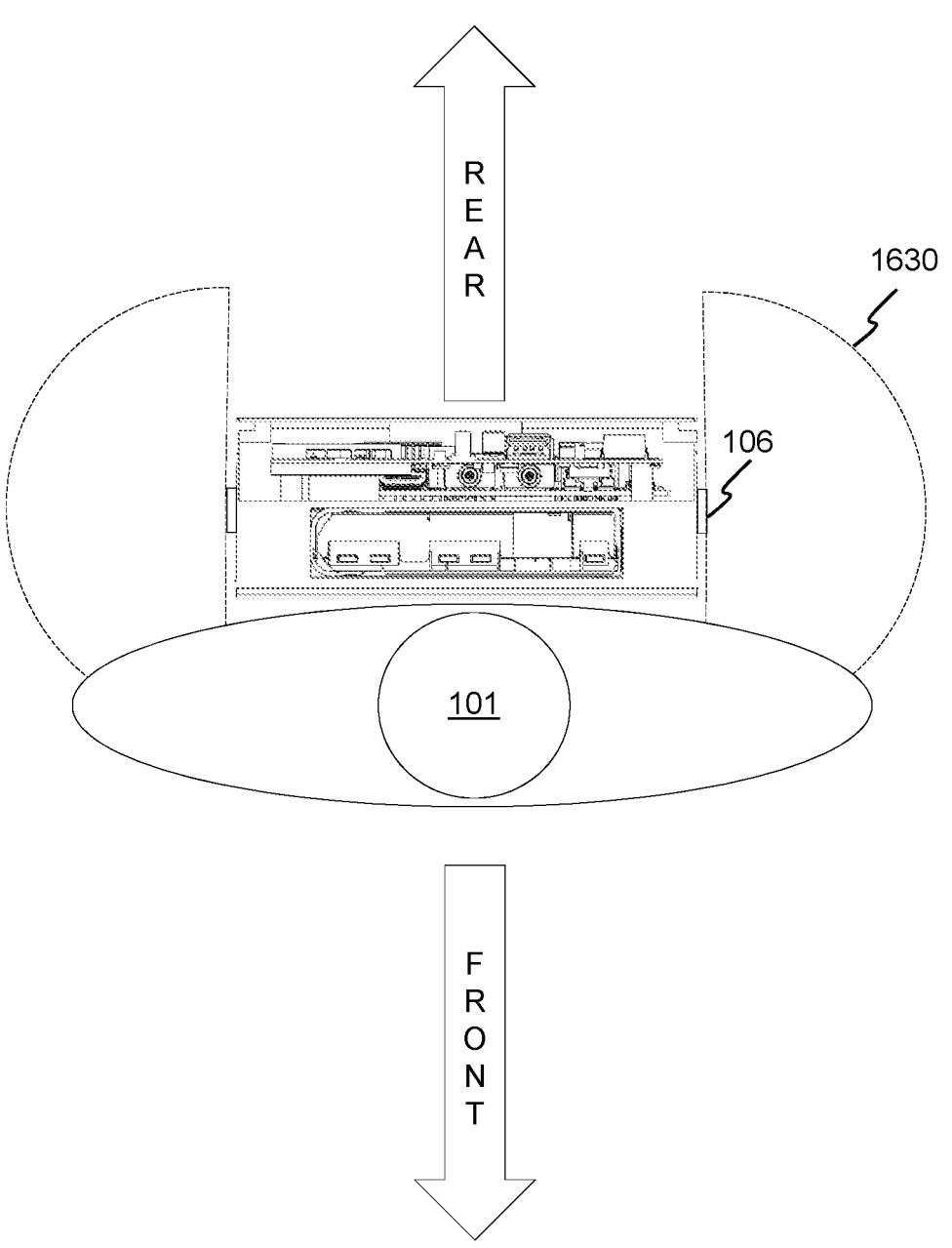
FIG. 16C illustrates a top view of the user wearing the WCN on their back and an associated RF pattern associated with antenna elements oriented at a parallel angle to each other, in accordance with certain embodiments.
Figure 17:
FIG. 17 illustrates a perspective view of the View A, in accordance with yet still other embodiments.
Figure 17:
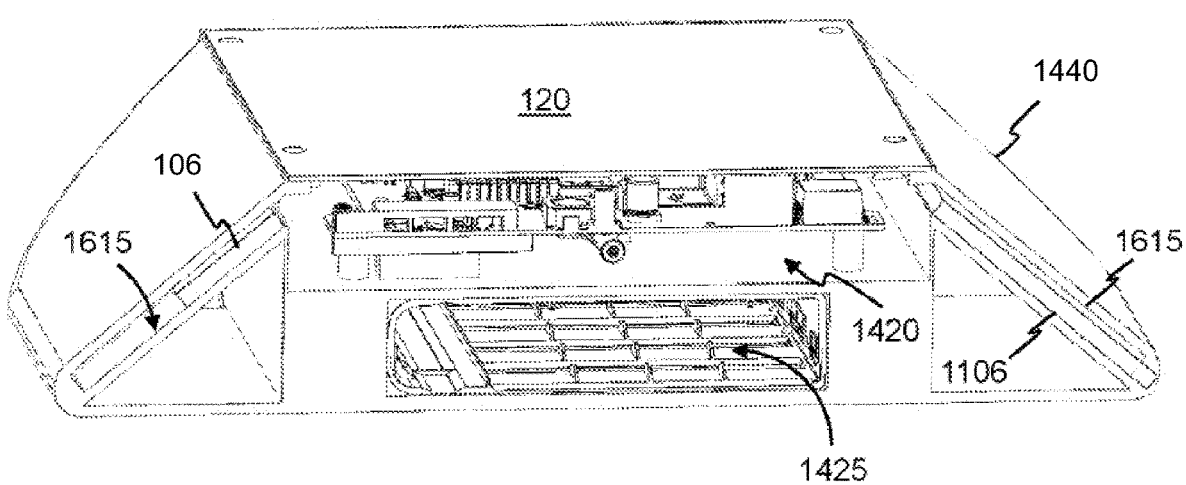
Figure 18:
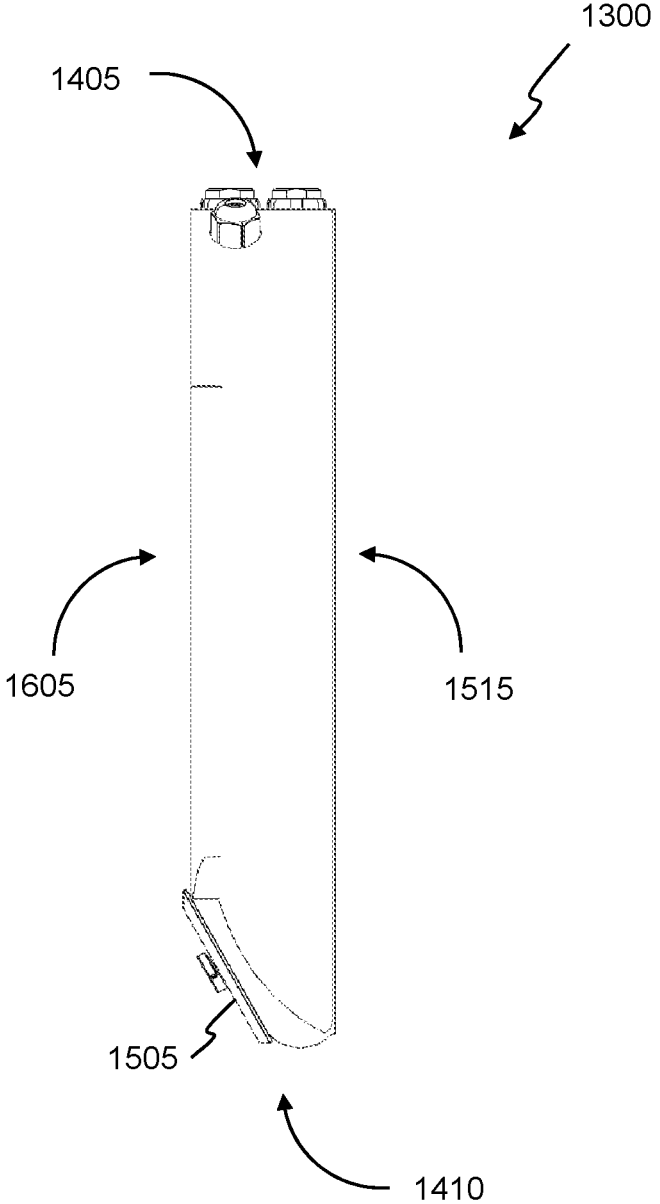
FIG. 18 illustrates a side view of the housing, in accordance with some embodiments.
Figure 19:
FIG. 19 illustrates a top view of the housing, in accordance with other embodiments.
Figure 19:
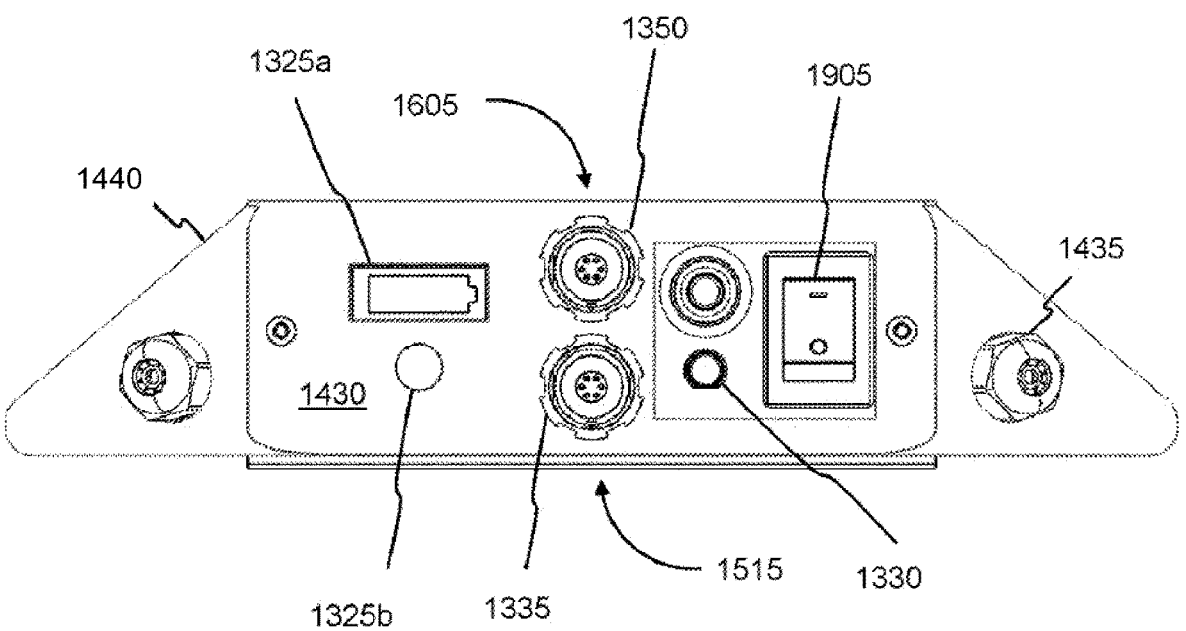
Figure 20:
FIG. 20 illustrates a bottom view of the housing, in accordance with certain embodiments.
Figure 20:
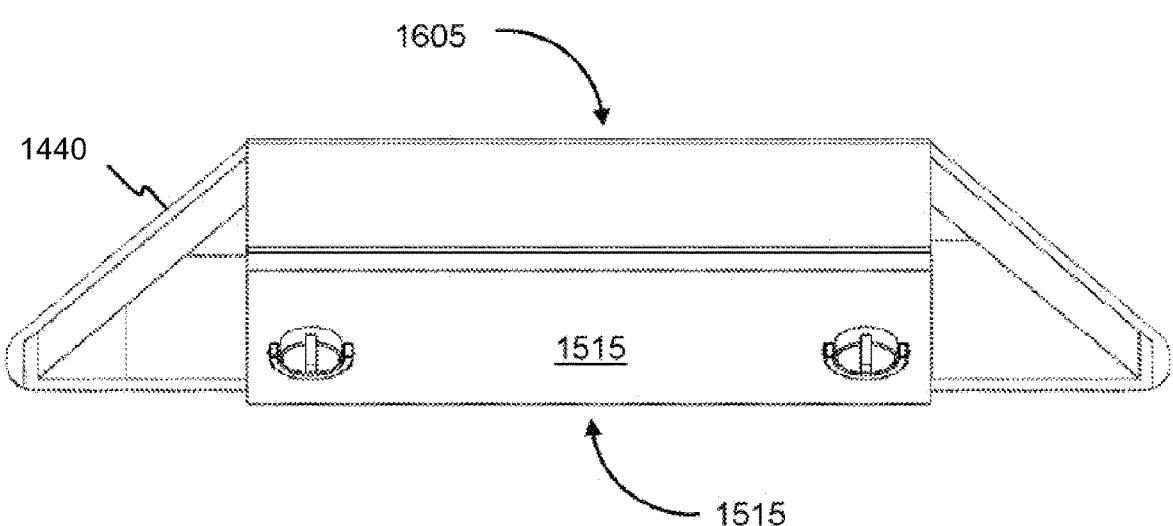
Figure 21:
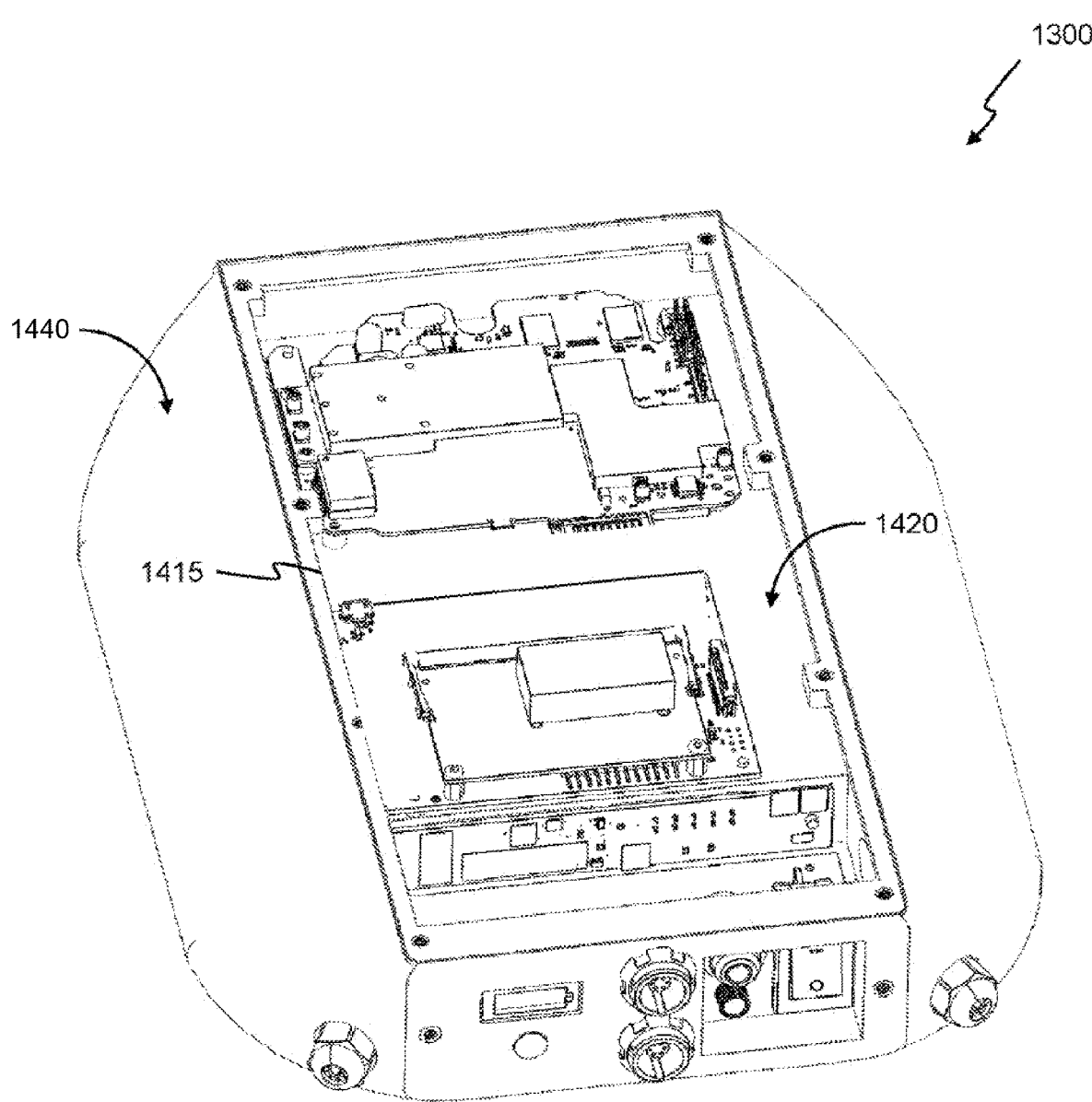
FIG. 21 illustrates a perspective view of the front portion of the housing, in accordance with yet still other embodiments.

Returning now to the discussion of the housing 1300, which houses the aforementioned electronic devices. The internal environment 1420 is positioned between the front portion 1605 and the rear portion 1515. Although the internal environment 1420 is shown as being substantially rectangular in shape, the component can have any shape that facilitates one or more embodiments of the instant disclosure (e.g., oval, oblong, square, polygonal, other shapes, or a combination of two or more thereof). Turning now to FIGS. 16B and 16C, which depict a top view of the user 101 wearing the WCN 110 on their back and the associated RF radiation pattern associated with each angle of the antenna elements 106. The front portion 1605 is smaller in width relative to the rear portion 1515. The WCN 110 performance characteristics, and hence those of the network, increase as the device achieves a 360° RF radiation pattern; however, such coverage is frustrated when the antenna elements 106 are not positioned and oriented in a manner to substantially achieve the 360° antenna coverage.

To achieve the 360° RF radiation pattern with the antenna elements 106 that are positioned in the shoulder strap 115, the housing 1300 includes at least one (ideally two) angular side 1440 is coupled to (i.e. connects) the front portion 1605 and the rear portion 1515, which are oriented substantially parallel to each other. The angular side 1440 includes an antenna slot 1615 positioned within that holds at least one antenna element 106. As shown in FIG. 16B, the angular side 1440 is oriented at an angle of about 35° to 65° (+/−3°) relative to the rear portion 1515 to thereby allow the antenna element 106 to transmit or receive a greater amount of EM radiation behind the user compared to an angle of about 90°, as depicted in FIG. 16C. Here, an increased portion of a beam width 1620 (oriented at an angle of about 35° to 65° (+/−3°)) is projected behind the user 101 compared to beam width 1630 (oriented at an angle of about 90°). To be sure, the rear portion 1515 includes a cooling panel 120 that is made of a metal (e.g., aluminum) and is demountably affixed to the housing 1300 via one or more demountable fasteners 305 and thereby covers the internal environment 1420.

Figure 12:
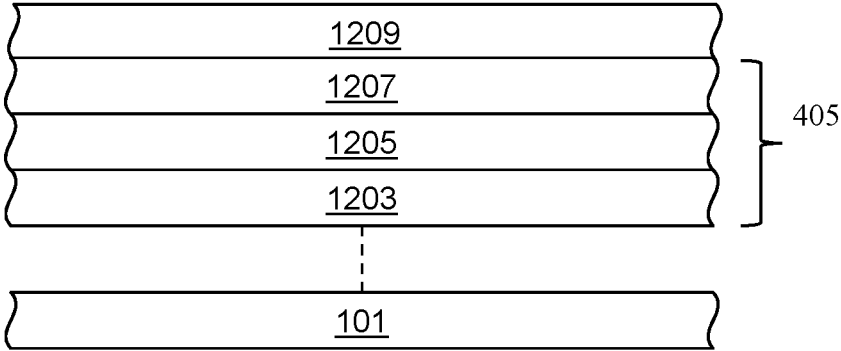
FIG. 12 illustrates a cross-section of a rear panel of the WNC positioned proximate to the user of FIG. 1B, in accordance with certain embodiments.

The cooling panel 120 is partially exposed to the ambient environment of the enclosure 125 and thermally couples the internal environment 1420 to the ambient environment and thereby functions as a heatsink to bleed heat generated within the internal environment therefrom. As a metal object, the cooling panel 120 can partially block the rear RF radiation that emanates from the antenna element(s) 106 of the housing 1300. Such blockage must be addressed to substantially achieve the 360° RF radiation pattern discussed above. Health risks to the user 101 should also be taken in to consideration. For example, the user 101 should be at least partially shielded from EM radiation that emanates from the housing 1300. For example, as the back panel 405 of the enclosure 125 is positioned between the torso and the housing 1300, the back panel 405 can include one or more EMI shielding layers 1207 that reflects (blocks, absorbs, and/or shields) EM radiation (e.g., such as RF radiation) that emanates from the enclosure 125 (i.e. the housing 1300 that includes the antenna element 106) away from the user 101. As shown in FIG. 12, the back panel 405 can be a multilayered structure that includes an external layer 1203 positioned proximate to a cushion layer 1205, which is positioned proximate an EMI shielding layer 1207. Internal components 1209 are positioned proximate to the EMI shielding layer 1207 and can at least include the housing 1300 and its components.

The housing 1300 can include one or more cable glands 1435 (e.g., an IP 67 rated cable gland). To increase the performance time of the WCN 110 and avoid downtimes due to charging the battery 1315, the battery 1315 should be replaceable. For example, the housing 1300 can include a battery access port 1425 that receives the battery 1315 into the internal environment 1420 and is covered by a port covering 1505. The battery access port 1425 can be positioned proximate to the bottom end 1410 or any location that satisfies one or more embodiments of the instant disclosure. The port covering 1505 is demountably secured to the battery access port 1425 via one or more demountable fasteners 1510. To be sure, all seals of the WCN 110 should be formed in a manner to have a protection rating of IP65 or higher.

Real-time locating systems ("RTLS"), also known as real-time tracking systems, are used to automatically identify and track the location of objects or people in real time, usually within a building or other contained area. RTLS known in the art typically use RF tags attached to objects or worn by people and fixed reference points to receive wireless signals from the tags and thereby determine their location. The RF locating system ("RFLS") of the instant disclosure is a novel RTLS that utilizes mobile reference points (e.g., sensor nodes in a "mesh" network configuration) to receive wireless signals and relative signal strength indicator ("RSSI") measurements to determine the position of an RF source of interest relative to the RTLS. As used herein, a "mesh" network refers to a self-organizing WAN where each node connects directly, dynamically, and non-hierarchically to the WAN. Turning now to FIGS. 22-26. In certain embodiments, the WCN 110 functions as a sensor node (e.g., node 2225) in an RFLS 2230 that determines the position of an RF source of interest 2320 relative to itself and/or the RTLS 2230. Sensing nodes ("nodes") 2225 can send sensed data to a node 2225 that is configured as a primary node deployed for data collection, transmission (e.g., to a remote location) and/or analysis. To be sure, the node 2225 includes one or more features, processes, steps, components, elements, shapes, and materials of the WCN 110. Applicable methods to determine the position of the RF source of interest include, but are not limited to, triangulation.

Herein disclosed is a RFLS that uses an inexpensive RF-based approach with low configuration requirements. RSSI is a measurement of how well a device receives a RF signal from an RF source of interest (e.g., an unknown source, device, apparatus, or system that emits RF signals that users/nodes desire to positionally identify). In other words, RSSI is a measurement of the power present in a received radio signal. The instant disclosure seeks to provide a RFLS 2230 that analyzes RSSI measurements from orthogonally positioned antenna elements using trigonometric ratios to determine the relative position of a RF source of interest 2320. The RF source of interest 2320 can be any RF source that emits any RF signal (e.g., UHF, VHF, Wi-Fi, Long-Term Evolution ("LTE"), 3G, 4G, 5G, other technology standards for broadband cellular networks, standards based on GSM/EDGE and/or UMTS/HSPA, Wi-Fi, IEEE 802.11 standards, General Packet Radio Service ("GPRS"), local area networking ("LAN") protocols, ("WAN") wide area networking protocols, Bluetooth®, microwave, and similar wireless communications protocols. The RF source of interest 2320 can be stationary and/or mobile.

Figure 22B:
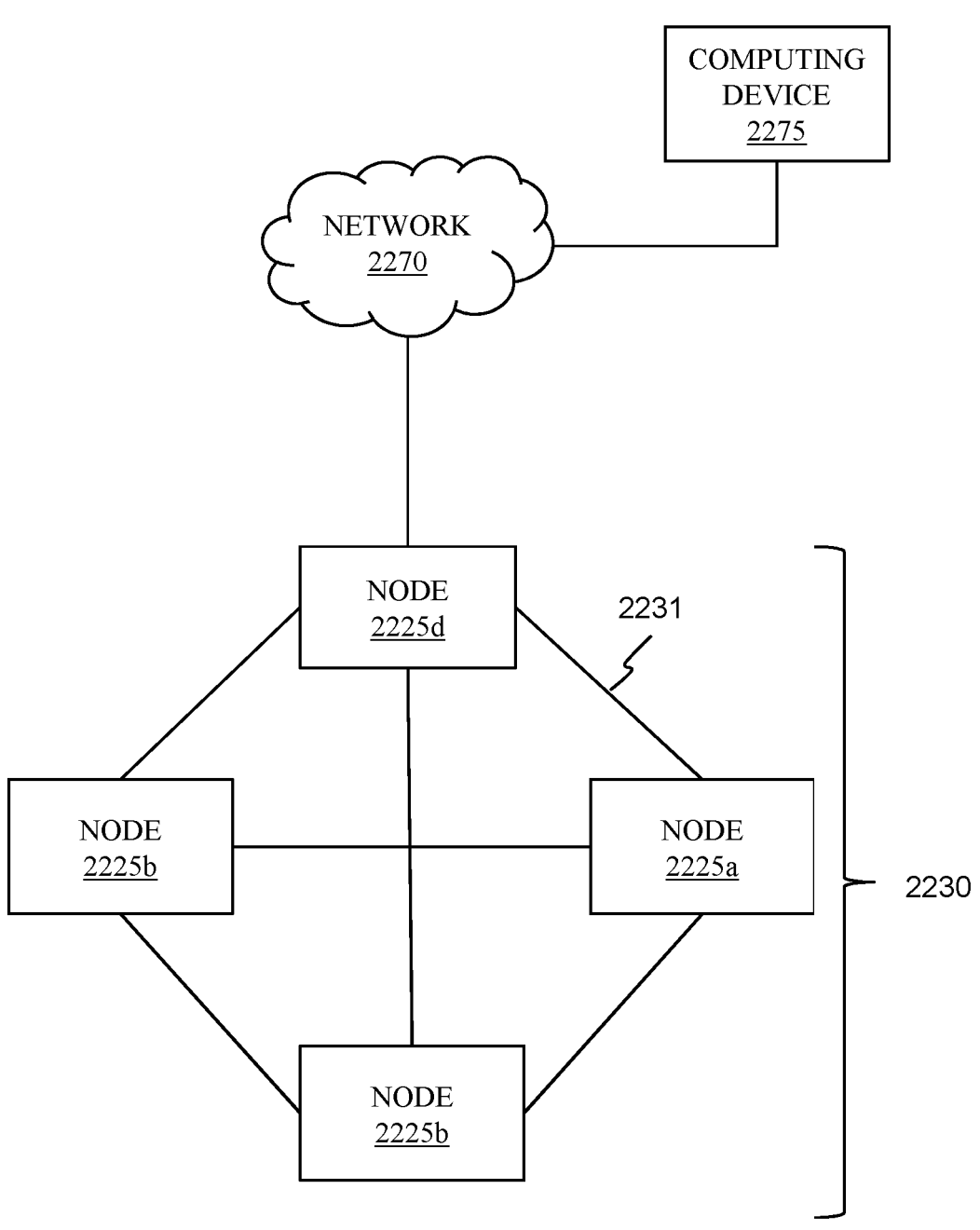
FIG. 22B illustrates a block diagram of an environment of the RFLS, in accordance with other embodiments.
Figure 23:
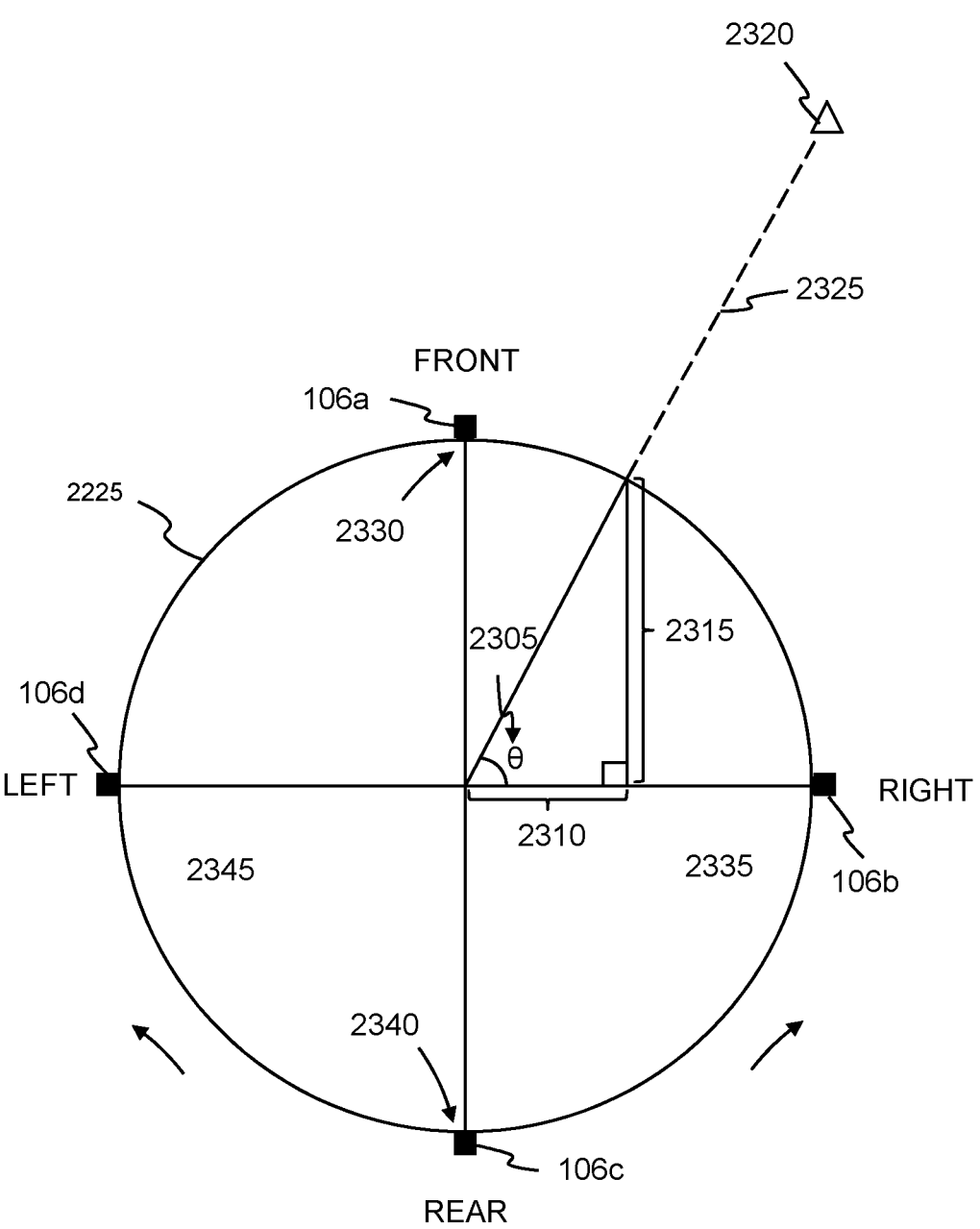
FIG. 23 illustrates a top view of the cardinal directions of a node ("nodal cardinal directions") and a solution to determine the angle (i.e. relative position) of a RF source of interest relative to two antenna elements using received signal strength indicator ("RSSI") values, in accordance with certain embodiments.

FIG. 22A illustrates operation steps of the RFLS 2230 to determine the position of a RF source of interest 2320, according to yet still other embodiments. As shown in FIG. 22B, the RFLS 2230 includes a plurality of nodes 2225 that communication with each other via a self-organizing WAN 2231 directly, dynamically, and non-hierarchically. The node 2225a, the node 2225b, the node 2225c, and the node 2225d each include one or more features, elements, materials, shapes, processes, steps, components, elements, properties, functionalities, and materials of the WCN 110 disclosed above. Each node 2225 performs the steps of FIG. 22A as well as those of FIGS. 25 and 26 discussed below. At Step 2205, the self-organizing WAN 2231 is established with other nodes 2225 and thereby each node 2225 connects directly, dynamically, and non-hierarchically to the WAN 2231. For example, the WAN 2231 can be established as soon as at least two of the nodes 2225 are within communication distance of each other (e.g., when the RF signal strength is sufficient for communications between the devices) or selectively as the user desires. At step 2210, a RSSI value is captured for each antenna element 106 oriented in each nodal cardinal direction to generate cardinal RSSI values that are associated with a RF signal that emanates from the RF source of interest 2320. FIG. 23 is a top view of a node 2225 that illustrates the four (4) nodal cardinal directions/points as well as the RF source of interest 2320, according to other embodiments. Nodal cardinal directions ("NCD") are the four main geometrical orientations relative to the node 2225.

For example, NCD 2330 is associated with the antenna element 106a and refers to the front of the median plane, NCD 2340 is associated with the antenna element 106c and refers to the back (or rear) of the median plane, NCD 2345 is associated with the antenna element 106d and refers to the left side of the transverse plane, and NCD 2335 is associated with the antenna element 106b and refers to the right side of the transverse plane. At Step 2210, the RSSI value for each antenna element 106 that is oriented in each nodal cardinal direction is captured (e.g., using the communications device 1395) to generate nodal cardinal RSSI values that are associated with a RF signal that emanates from the RF source of interest 2320. At Step 2215, a position of the RF source of interest 2320 relative to the node 2225 (i.e. itself) is determined using the nodal cardinal RSSI values. In some embodiments, Step 2215 can be accomplished via the process steps of FIG. 26. Here, at Step 2605, geolocation data associated with the node 2225 is captured via the geolocation device 1320. Applicable geolocation data includes positional coordinates and/or heading information. At Step 2610, the orientation of the antenna elements 106 of interest (e.g., the antenna element 106a and the antenna element 106b) and an angle of the RF source of interest 2320 relative to the antenna elements of interest 106 (e.g., the angle 2306) is determined using the geolocation data and the nodal cardinal RSSI values. Turning now to FIG. 23. Trigonometric ratios are evaluated with respect to sides and angles. Observing a node 2225 from the top view allows one to view RSSI values and antenna element 106 placements in terms of a unit circle having nodal cardinal points.

If adjacent antenna elements 106 (e.g., the antenna element 106a and the antenna element 106b) are orthogonally positioned relative to each other, then their respective RF radiation patterns are similarly positioned and can, at least theoretically, be treated as sides of a right triangle where RSSI value replaces length. As such, the ratio of the two RSSI values can be related to an angle 2305 that represents the relative position of RF source of interest 2320 to the antenna elements of interest (i.e. antenna element 106a and the antenna element 106b). All nodal cardinal RSSI values include a first RSSI value 2315 and a second RSSI value 2310, where the first RSSI value 2315 is greater than the second RSSI value 2310. The angle 2305 is preferably determined using an inverse tangent of a quotient defined by the first RSSI value 2315 as the dividend and the second RSSI value 2310 as the divisor.

Alternatively, the nodal cardinal RSSI values can be transmitted to a primary node (i.e. a node 2225 configured as a primary node) or a computing device 2275 that communicates with the WAN 2231 (e.g., via a network 2270) for processing. Here, the primary node can determine the position of the RF source of interest 2320 relative to each node 2225 and/or the RFLS 2230 and transmit the determined position to one or more of each node 2225, a predetermined subset thereof, and the computing device 2275. In other words, the node 2225 can also function as a primary node that receives input (e.g., captured RSSI values, determined positional information, general communications, etc.) from other node 2225. The network 2270 can be, for example, a local area network ("LAN"), a wide area network ("WAN"), such as the Internet, or a combination of the two, and can include wired, wireless, and/or fiber optic connections.

The network 2270 can be compatible with a variety of frequencies, such as those associated with Bluetooth, Wi-Fi, LTE, cellular, radio, microwave, as well as wireless communication. In general, network 2270 can be any combination of connections and protocols that will support communications between the node(s) 2225 and the computing device 2275. The computing device 2275 may be a desktop computer, mobile computer (e.g., smart phone, laptop, tablet, smart watch, personal digital assistant, or similar device), wearable computer, cluster computer, thin client, cloud computer, or similar computing device that can communicate with the WAN 2230 (e.g., via the network 2270) and perform the herein disclosed functions, processes, and steps. At Step 2220, when not functioning as a primary node, the determined position is transmitted, via the communication device 1395, to a primary node (i.e. a node 2225 configured as a primary node) of the plurality of nodes or a computing device that is communicatively positioned external to the WAN 2230 (e.g., the computing device 2275) for processing. In some embodiments, the primary node (e.g., node 2225a) uses, for example, triangulation to determine the position of the RF source of interest relative to the RFLS 2230. At Step 2225, when functioning as a primary node, the position of the RF source of interest relative to the plurality of node 2225 is determined using the received determined position.

Figure 25:
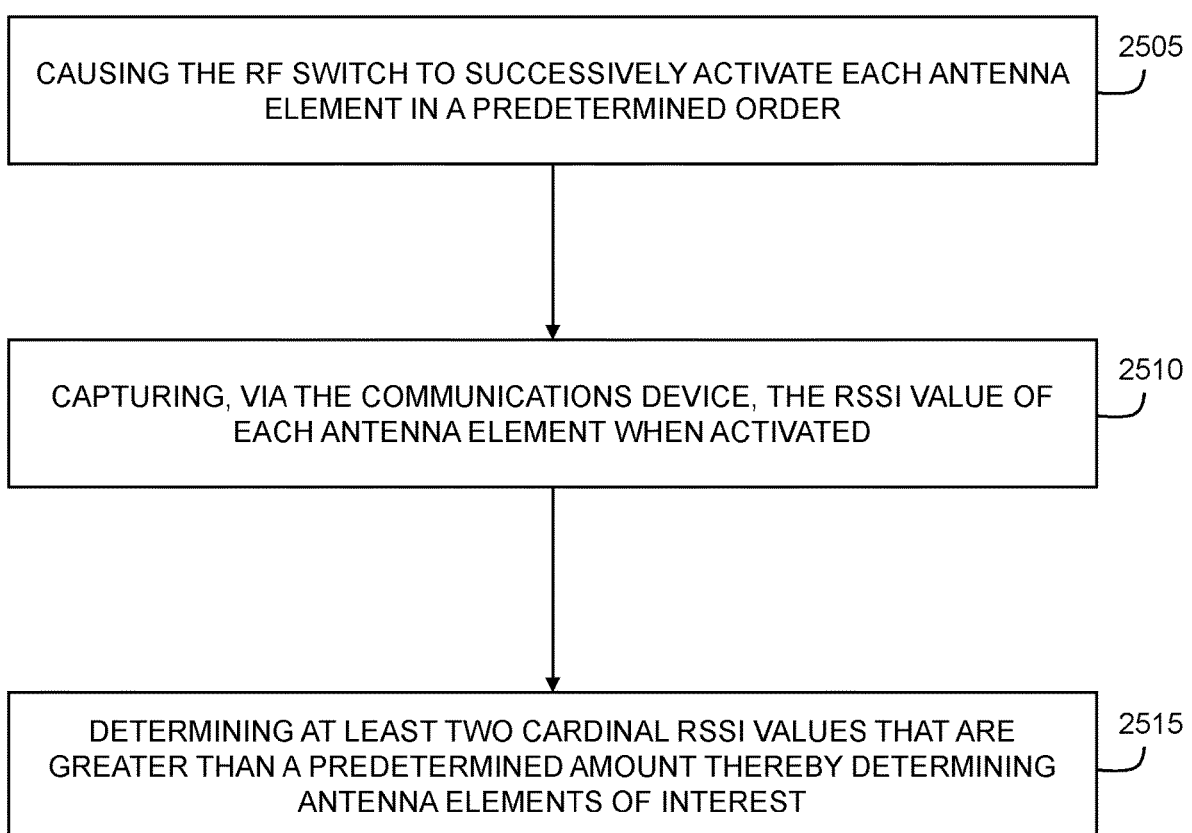
FIG. 25 illustrates the operational steps of the RFLS to enable the capture of RSSI values for each antenna element oriented in each nodal cardinal direction, in accordance with some embodiments.
Figure 26:
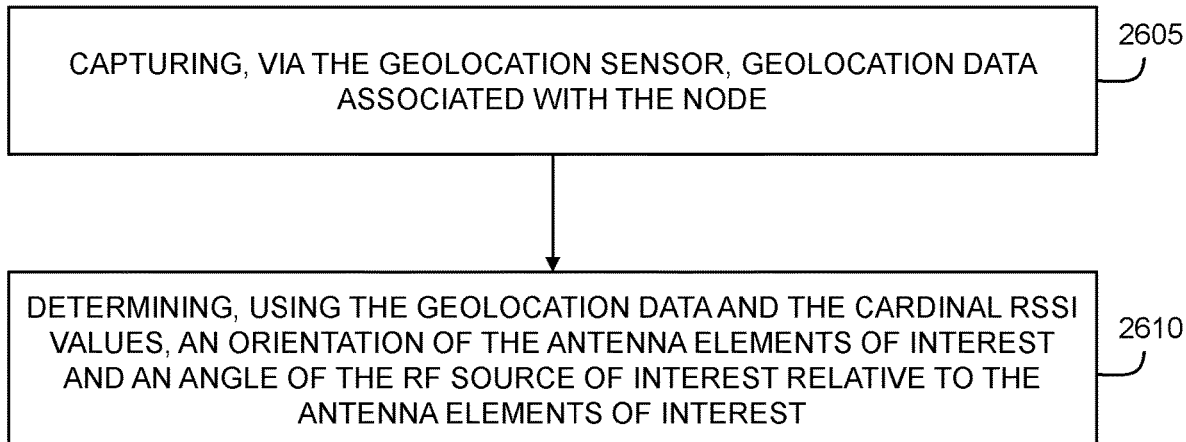
FIG. 26 illustrates the operational steps of the RFLS to enable the determination of the position of the RF source of interest relative to a node, in accordance with some embodiments.

In certain embodiments, each node 2225 further includes a RF switch 1395 (i.e. a device that routes high frequency signals through transmissions paths). The RF switch 1395 is communicatively coupled to the control circuit 1310 and is conductively coupled to each antenna element 106. Here, the step of capturing the RSSI value for each antenna element 106 oriented in each nodal cardinal direction can be accomplished using the RF switch 1395. Turning now to FIG. 25. As reflected, at Step 2505, the RF switch 1395 is caused to successively activate each antenna element 106 in a predetermined order (e.g., clockwise, counter clockwise, other sequence, or random sequence). For example, adjacently positioned antenna elements 106 (e.g., the antenna element 106a and antenna element 106b, the antenna element 106b and antenna element 106c, the antenna element 106c and antenna element 106d, and the antenna element 106d and antenna element 106a) can be activated in unison to increase the relationship accuracy of the captured RSSI values and subsequent accuracy of the determined positional information.

Figure 24:
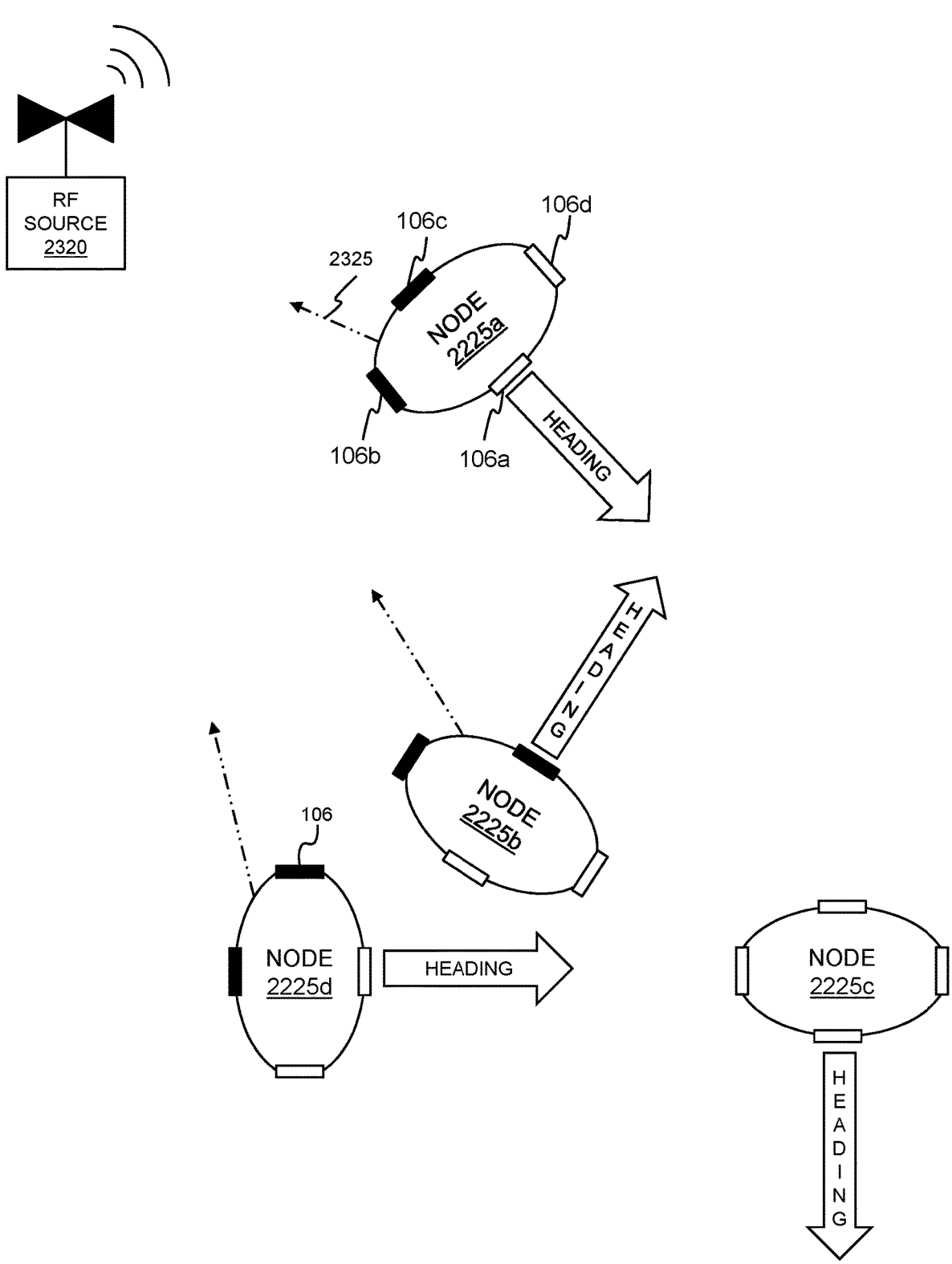
FIG. 24 illustrates a top view of an exemplary triangulation event for determining the position of the RF source of interest relative to the RFLS, in accordance with yet still other embodiments.

For example, referring now to FIG. 23, activation of adjacently positioned antenna elements 106 can occur in a predetermined order (e.g., clockwise, counter clockwise, other sequence, or random sequence). In certain embodiments, only a subset of the antenna elements 106 are activated (e.g., only those antenna elements 106 that have an associated RSSI value above a threshold amount) to improve batter life. At Step 2510, the RSSI value of each antenna element 106 is captured via the communications device when activated. At Step 2515 at least two cardinal RSSI values that are greater than a predetermined amount (e.g., relative to background and/or adjacent antenna elements 106) are determined and thereby the antenna elements 106 of interest are determined. Turning now to FIG. 24 (not drawn to scale), the antenna elements 106 of interest are blacked out (e.g., the antenna element 106c and the antenna element 106b of the node 2225a). To be sure, the antenna elements 106 of interest of the node 225b and the node 2225d are also blacked out. The node 2225c is positioned too far away from the RF source 2320 to detect the device. As such, the node 2225c does not include any antenna elements 106 of interest.

Figure 27:
FIG. 27 illustrates a man portable node for use in outdoor rugged environments ("drop node"), according to some embodiments.
Figure 27:
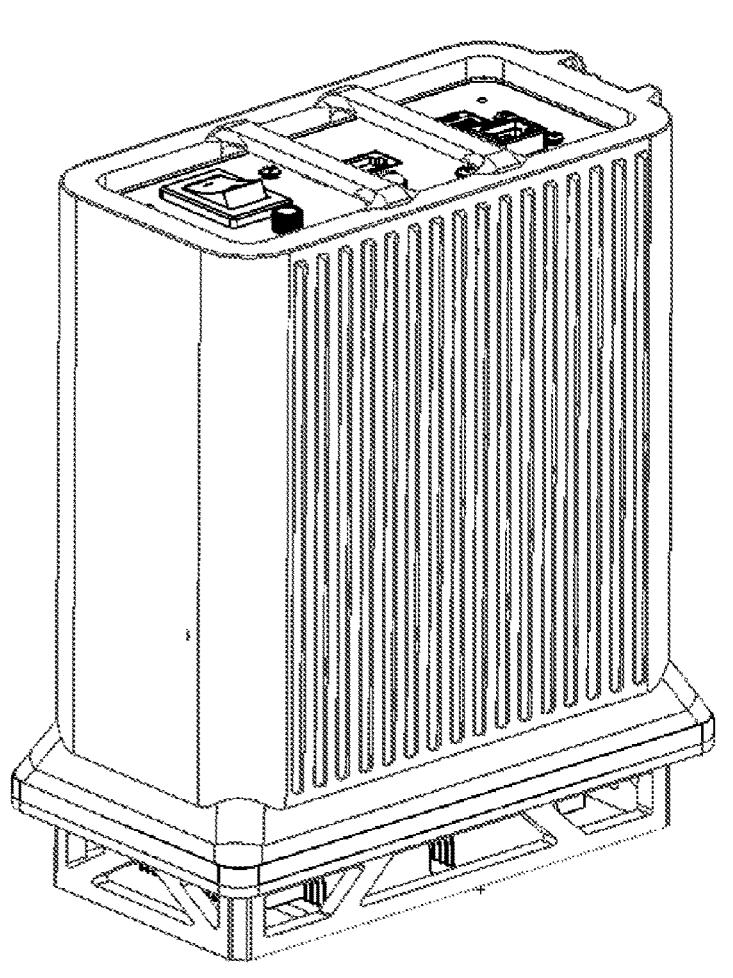
Figure 28:
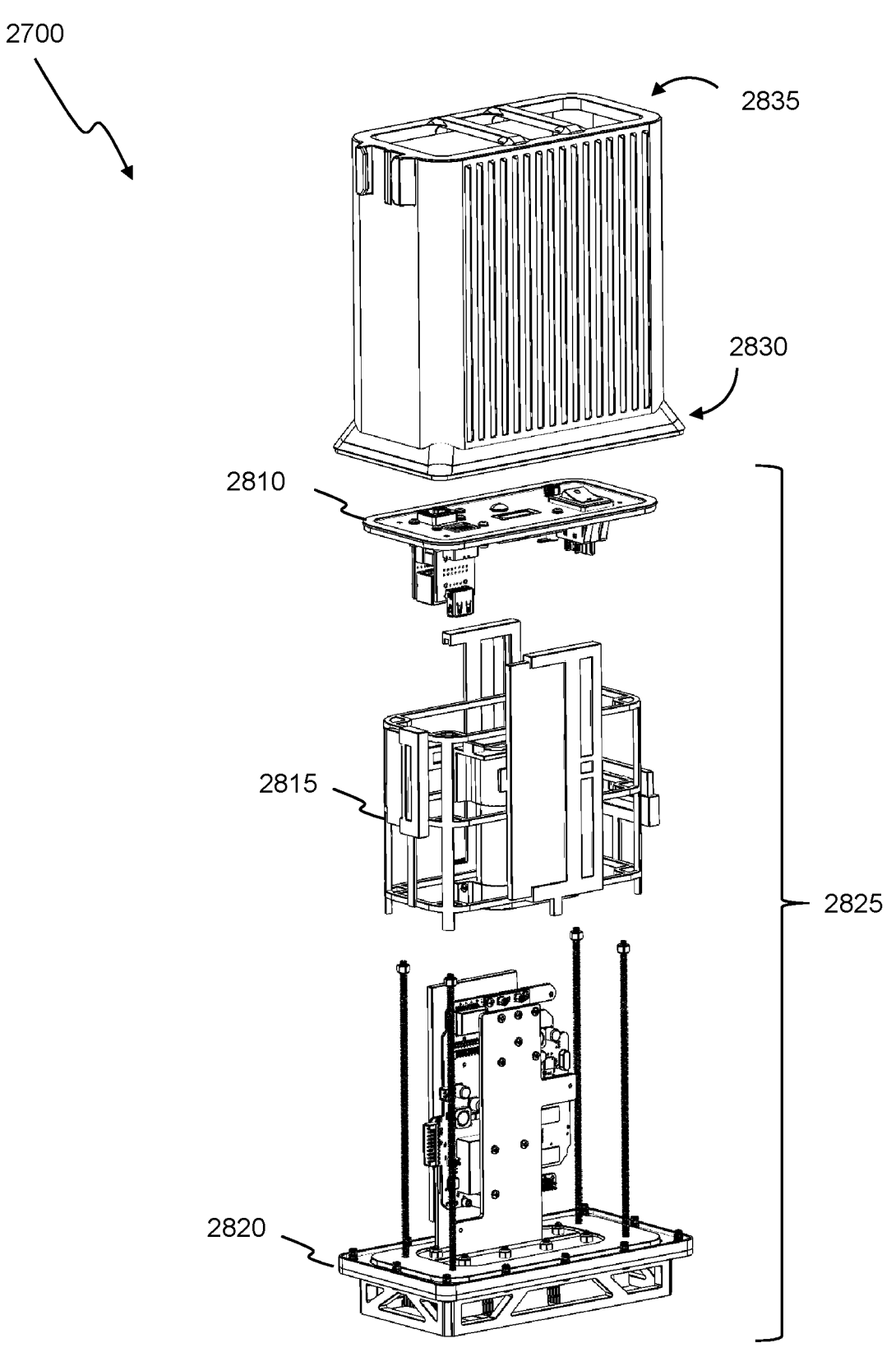
FIG. 28 illustrates an exploded view of the drop node showing the enclosure, the interfacing plate, the antenna assembly, and the board mounting assembly, according to other embodiments.
Figure 29:
FIG. 29 illustrates an exploded view of the interfacing plate assembly, according to certain embodiments.
Figure 29:
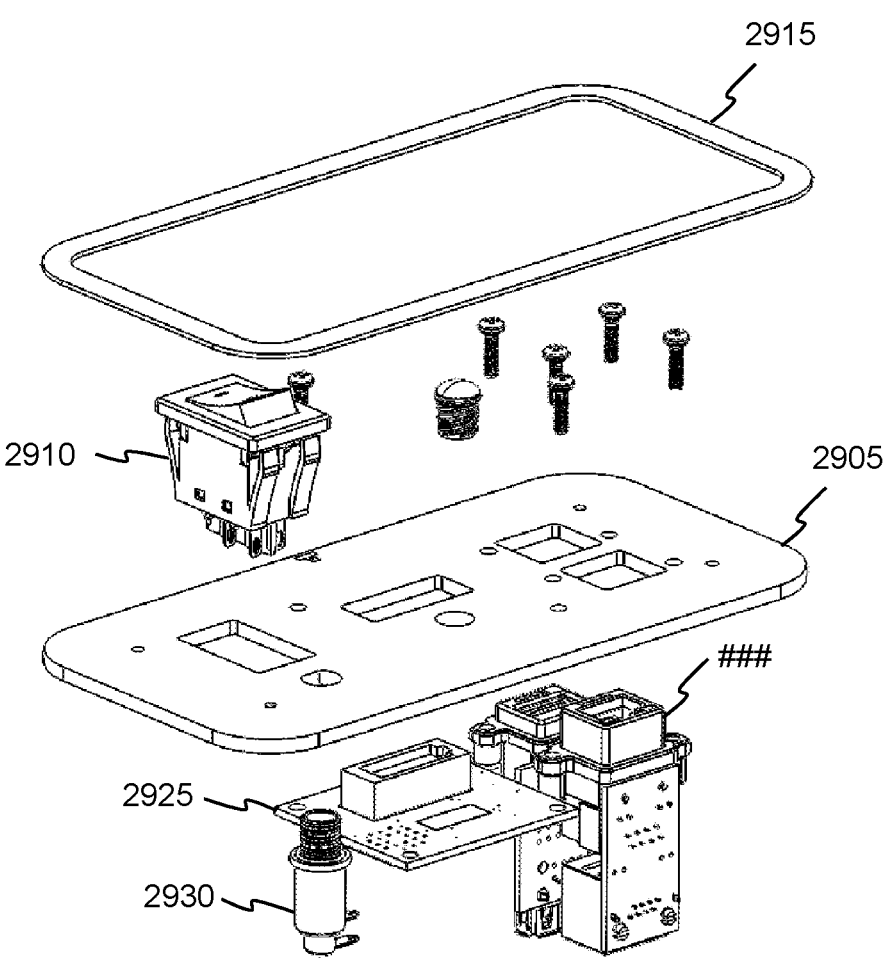
Figure 30:
FIG. 30 illustrates a perspective view of the antenna assembly with no contents, according to yet still other embodiments.
Figure 30:
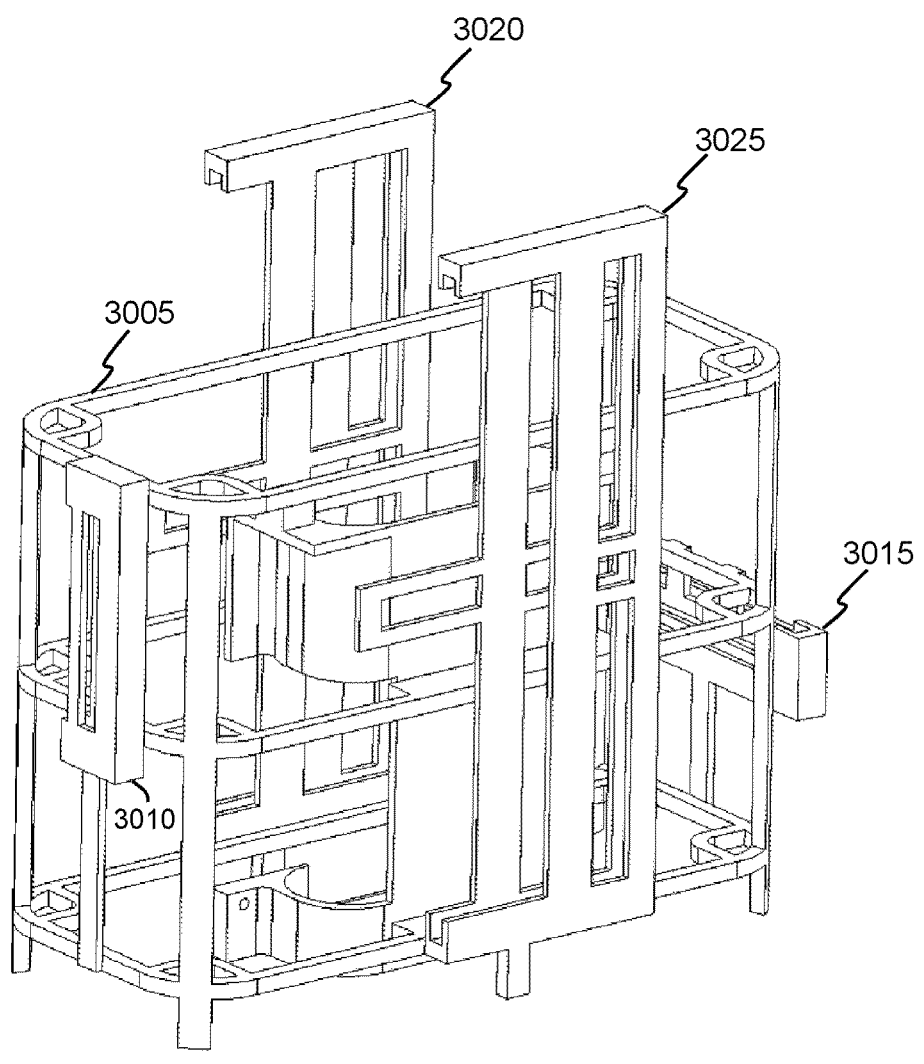
Figure 31:
FIG. 31 illustrates a top view of the antenna assembly of FIG. 30, according to yet still other embodiments.
Figure 31:
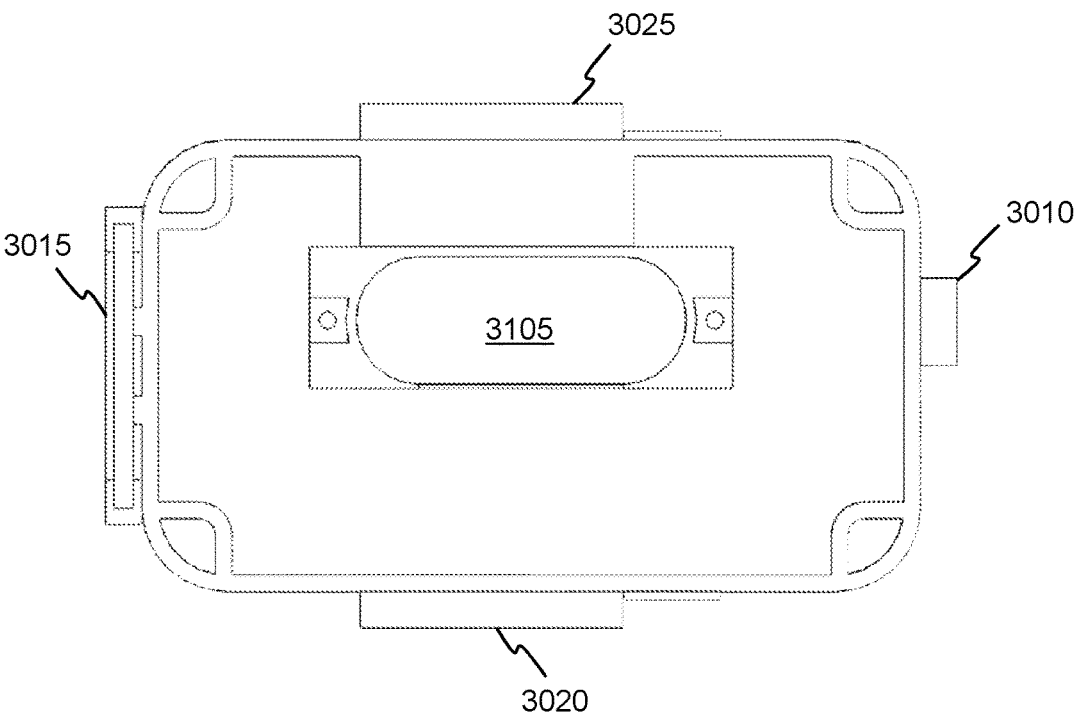
Figure 32:
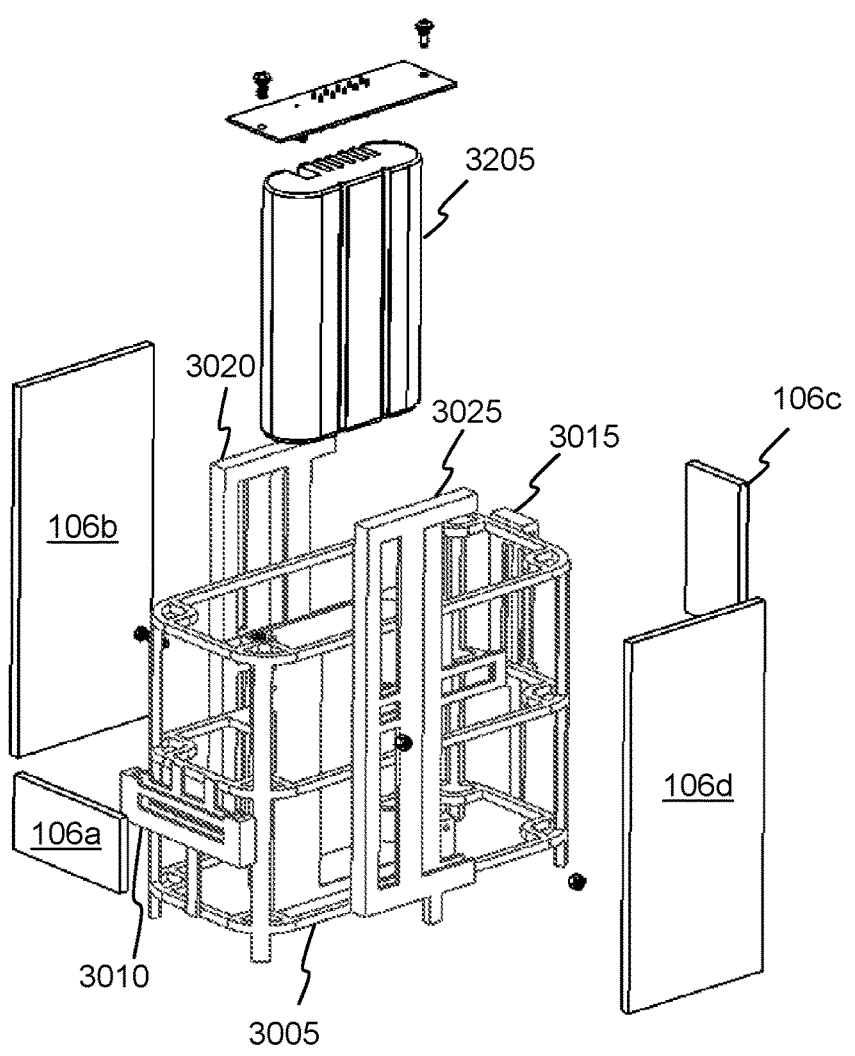
FIG. 32 illustrates an exploded view of the antenna assembly showing the placement and orientation of a power source and antenna elements that are positioned at the four nodal cardinal directions, according to yet still other embodiments.
Figure 33:
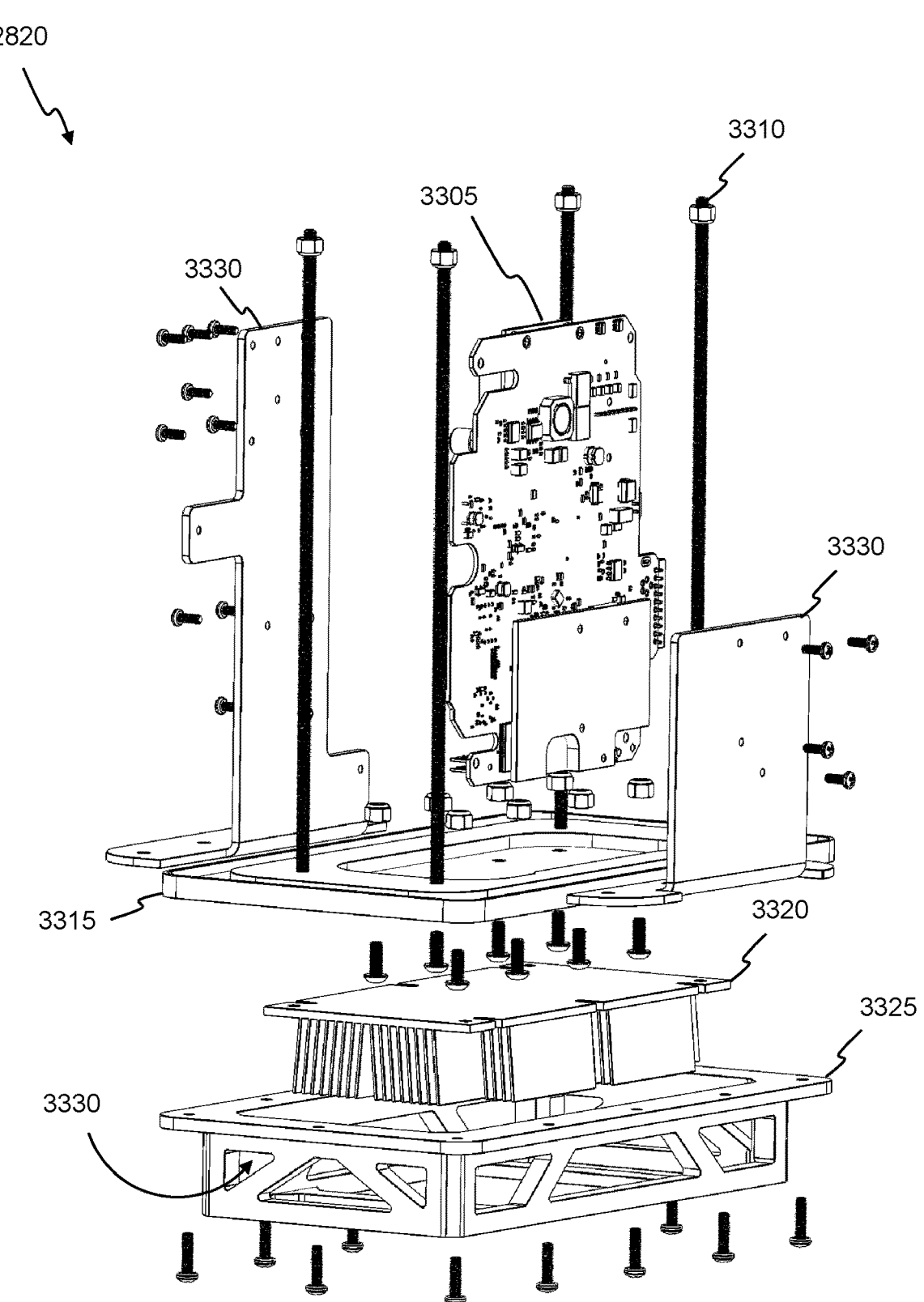
FIG. 33 illustrates an exploded view of the board mounting assembly showing the placement and orientation of a board (i.e. a control circuit), fasteners, a plate, thermal conductors, a passive heat exchanger, and a brace, according to some embodiments.

Turning now to FIGS. 27-33. FIG. 27 illustrates a man portable node for use in outdoor rugged environments ("drop node"), generally 2700, according to some embodiments. The drop node 2700 is configured to be hung, placed on or affixed to a surface (e.g., on the ground, roads, counter tops, other non-biological surfaces) during operation. To be sure, the drop node 2700 is a communications node that includes one or more features, elements, materials, shapes, processes, steps, components, elements, properties, functionalities, and materials of the WCN 110 disclosed above. The drop node 2700 can function as a node 2225 of the RFLS 2230. The drop node 2700 is a man-portable communications node that includes an interfacing plate 2810, an antenna assembly 2815, and a board mounting assembly 2820. The housing 2825 includes the antenna assembly 2815 and the board mounting assembly 2820.

The drop node 2700 is configured to operate in environment that have extreme cold (e.g., near or below freezing temperatures) and/or heat (e.g., at least 90° F.) as well as those that experience chemical spills (e.g., chemicals that are toxic, self-reactive, oxidizing, or corrosive). As such, the drop node 2700 should be made using materials that maintain their structural integrity in such environments (e.g., steel and other metals, alloys, ceramics, polymers such as polyethylene terephthalate, Teflon, Kevlar, polycarbonate etc.). The enclosure 2805 is a rigid, open ended, sleeve structure that selectively receives the housing 2825 at a first end 2830 and thereby encloses the antenna assembly 2815 and the board mounting assembly 2820 therein. The enclosure 2805 receives the interfacing plate assembly 2810 at a second end 2835 positioned opposite the first end 2830. In other words, the interfacing plate assembly 2810 is positioned proximate to the second end 2835 opposite the first end 2830. The interfacing plate assembly 2810 includes an interfacing plate 2905 externally positioned proximate to the second end 2835. The interfacing plate assembly 2810 is positioned to seal off the second end 2835 from the ambient environment of the drop node 2700. The interfacing plate assembly 2810 is positioned proximate to the antenna assembly 2815.

The interfacing plate 2905 includes an input device 2910 conductively coupled to the control circuit 1310, the input device 2910 receives user operational input (e.g., power up, power down, illumination settings, etc.). Although depicted as a switch, the input device 2910 can be any input device that allows users to selectively activate and deactivate one or more functions of the drop node 2700 (e.g., power up/down, toggle illumination elements, etc.). The interfacing plate 2905 is a rigid and metallic structure that is hermetically coupled (i.e. sealed) to the housing 2805 (e.g., via a gasket 2915). The antenna assembly 2815 includes a frame 3005 that includes the antenna elements 106 oriented in each nodal cardinal direction. Alternatively, the antenna elements 106 can be externally positioned on the enclosure 2805. As discussed above in reference to FIG. 23, nodal cardinal directions are the four main geometrical orientations relative to the node 2700 (i.e. front, back, left, and right). The frame 3005 is a rigid structure that includes antenna slots (e.g., antenna slot 3010, antenna slot 3015, antenna slot 3020, and antenna slot 3025). The frame 3005 includes the battery 1315 rigidly and/or selectively affixed therein and surrounded by the antenna elements 106.

The antenna slot 3010, the antenna slot 3015, the antenna slot 3020, and the antenna slot 3025 are peripherally positioned on the antenna frame 3005 and spaced in a manner to reduce and/or eliminate interference between adjacently positioned antenna elements 106. The antenna frame 3005 can include additional antenna slots than depicted. The antenna slot 3010, the antenna slot 3015, the antenna slot 3020, and antenna slot 3025 are each oriented in a cardinal direction. For example, the antenna slot 3010 is positioned opposite to the antenna slot 3015 and orthogonal to the antenna slot 3020 and the antenna slot 3025. The antenna slot 3015 is positioned orthogonal to the antenna slot 3020 and the antenna slot 3025. The antenna slot 3010, the antenna slot 3015, the antenna slot 3020, and the antenna slot 3025 each slidably and selectively receives one of the antenna elements 106. In other embodiments, at least one of the antenna elements 106 is vertically polarized or positioned and at least another is horizontally polarized or positioned to increase the radiation pattern above and below the drop node 2700.

Each antenna slot receives at least one antenna element 106. For example, the antenna slot 3010 receives the antenna element 106a. The antenna slot 3015 receives the antenna element 106c. The antenna slot 3020 receives the antenna element 106b. The antenna slot 3025 receives the antenna element 106d. The board mounting assembly 2820 at least includes the communication device 1395 and the control circuit 1310 each positioned proximate to a plate 3315. Preferably, the board mounting assembly 2820 at least includes the communications device 1395, the control circuit 1310, the geolocation device 1320, and the RF switch 1305. The plate 3315 is demountably coupled to the first end 2830 of the enclosure 2805 opposite the interfacing plate 2905. The plate 3315 is structurally rigid and includes metallic (e.g., aluminum, copper, steel, other metals, as well as alloys), ceramic, and/or polymer materials for heat-sensitive applications.

For example, the plate 3315 is thermally coupled to at least one of the communications device 1395, the control circuit 1310, the geolocation device 1320, and the RF switch 1305 as well as an ambient environment of the drop node 2700 to dissipate heat generated by such components to the ambient environment of the drop node 2700. The board mounting assembly 2820 further includes at least one thermal conductor structure 3330 that are positioned proximate to and in thermal communication with the plate 3315. The thermal conductor structure 3330 preferably vertically extends from the plate 3315 in a manner to be positioned proximate to one or more of the communications device 1395, the control circuit 1310, the geolocation device 1320, and the RF switch 1305 to thereby dissipate heat therefrom to the ambient environment of the drop node 2700.

In other words, the plate 3315 helps dissipate thermal energy generated by the communications device 1395, the control circuit 1310, the geolocation device 1320, and/or the RF switch 1305 (i.e. one or more electrical components positioned within the drop node 2700) to the ambient environment of the drop node 2700. In some embodiments, the drop node 2700 is an airtight device to ensure the correct and safe functionality of the electronic components positioned therein while operating in challenging environments. Here, the plate 3315 is hermetically coupled (i.e. sealed) to the enclosure 2805 proximate to the first end 2830 and opposite the interfacing plate 2905. The board mounting assembly 2820 further includes a passive heat exchanger 3320 thermally coupled to the plate 3315 and externally positioned proximate to the first end 2830 when the enclosure 2805 receives the housing 2825. The passive heat exchanger 3320 is designed to maximize its surface area in contact with the ambient environment. For example, the passive heat exchanger 3320 can include pin-fins, straight fins, and/or flared fins (i.e. fins that are not positioned parallel to each other) that extend from its base. In general, the more surface area the passive heat exchanger 3320 has, the greater its performance will be.

Air velocity, choice of material, protrusion design and surface treatment are factors that can be maximized to positively affect the performance of the passive heat exchanger 3320. For example, the passive heat exchanger 3320 can include fins, dimples, ridges, or other protrusions that extend from the surface thereof to its increase surface area. Natural air convection requires free flow of air over passive heat exchanger 3320. If the protrusions are not aligned vertically, or if they are positioned too close together to allow sufficient air flow between them, the efficiency of passive heat exchanger 3320 will decline. The passive heat exchanger 3320 can be made by extrusion, casting, skiving, and/or milling. In some embodiments, the passive heat exchanger 3320 is replaced by an active heat exchanger. The passive heat exchanger 3320 transfers thermal energy from the plate 3315 to the ambient environment.

The plate 3315 is preferably structurally rigid and metallic. The plate 3315 is positioned proximate to the base 3325. The plate 3315 is positioned proximate to one or more of the communications device 1395 and the control circuit 1310. The plate 3315 thermally couples one or more of the communications device 1395 and the control circuit 1310 to an ambient environment of the communications node (i.e. the drop node 2700). The ambient environment is positioned proximate to the plurality of orifices 3330, which can be any shape or size that satisfies one or more embodiments.

Figure 34:
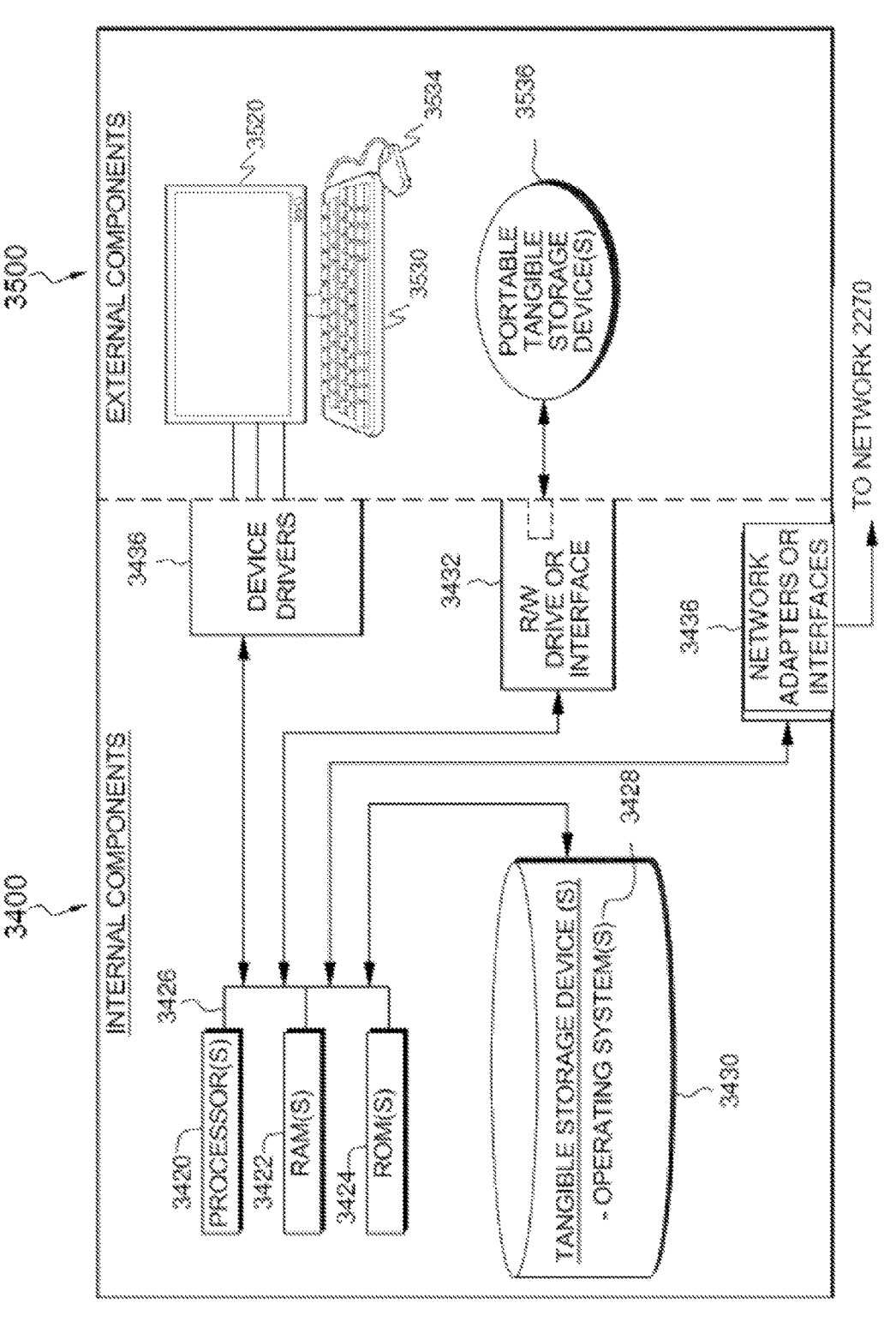
FIG. 34 depicts a block diagram of components of the WCN 110, in accordance with other embodiments.

FIG. 34 depicts a block diagram of components of the WCN 110, the drop node 2700, and the computing device 2275, in accordance with an embodiment of the present invention. Data processing system 3400, 3500 is representative of any electronic device capable of executing machine-readable program instructions. Data processing system 3400, 3500 may be representative of a smart phone, a computer system, PDA, or other electronic devices. Examples of computing systems, environments, and/or configurations that may represented by data processing system 3400, 3500 include, but are not limited to, personal computer systems, server computer systems, thin clients, thick clients, wearable computer, hand-held or laptop devices, multiprocessor systems, microprocessor-based systems, network PCs, minicomputer systems, clustered computing devices, and distributed cloud computing environments that include any of the above systems or devices.

Each WCN 110 (as well as all derivatives defined in the instant disclosure) can be configured to analyze vaporous chemicals, digital images, and/or RF spectra. As reflected in FIG. 13A, the WCN 110 can include a camera 1355 and/or a sensor 1360 each communicatively coupled to the control circuit 1310. The camera 1355 is one or more devices that captures images using visible light, infrared light (e.g., thermal-imaging camera), and/or time-of-flight calculations (e.g., 3D time-of-flight camera). The camera 1355 captures two-dimensional images and/or three-dimensional images. The sensor 1360 is preferably one or more devices that capture chemical signatures and/or spectrum trace data. The sensor 1360 can be a device that detects the presence of chemical vapors or gases that are present proximate to the WCN 110. In this manner, the sensor 1360 can detect combustible, flammable and toxic gases, and oxygen depletion.

The sensor 1360 can be configured as an electrochemical gas detector that allows gases to diffuse through a porous membrane to an electrode where it is either chemically oxidized or reduced. The amount of current produced is determined by how much of the gas is oxidized at the electrode, indicating the concentration of the gas. The sensor 1360 can be configured as a catalytic bead sensor that measures combustible gases that present an explosion hazard when concentrations are between the lower explosion limit ("LEL") and upper explosion limit ("UEL"). For example, active and reference beads containing platinum wire coils are situated on opposite arms of a Wheatstone bridge circuit and electrically heated, up to a few hundred degrees Celsius. The active bead contains a catalyst that allows combustible compounds to oxidize, thereby heating the bead even further and changing its electrical resistance. The resulting voltage difference between the active and passive beads is proportional to the concentration of all combustible gases and vapors present. The sampled gas enters the sensor through a sintered metal frit, which provides a barrier to prevent an explosion when the instrument is carried into an atmosphere containing combustible gases. The sensor 1360 can be a photoionization detector ("PID") that uses a high-photon-energy UV lamp to ionize chemicals in the sampled gas. If the compound has an ionization energy below that of the lamp photons, an electron will be ejected, and the resulting current is proportional to the concentration of the compound.

The sensor 1360 can be an infrared ("IR") point sensor that uses radiation passing through a known volume of gas. Energy from the sensor beam is absorbed at certain wavelengths, depending on the properties of the specific gas. For example, carbon monoxide absorbs wavelengths of about 4.2-4.5 μm. The energy in this wavelength is compared to a wavelength outside of the absorption range, where the difference in energy between these two wavelengths is proportional to the concentration of gas present. The sensor 1360 can be an infrared image sensor that includes active and passive systems. For active sensing, the sensor 1360 scans a laser across the field of view of a scene and determines the presence of backscattered light at the absorption line wavelength of a specific target gas. For passive IR imaging, the sensor 1360 measures the spectral changes of each pixel in an image and determines the presence of specific spectral signatures that indicate the presence of target gases. The types of compounds that can be imaged are the same as those that can be detected with infrared point detectors, but the images may be helpful in identifying the source of a gas.

The sensor 1360 can be a semiconductor sensor, also known as metal-oxide-semiconductor ("MOS") sensor that detects gases by a chemical reaction that occurs when the gas comes in direct contact with the sensor 1360. For example, tin dioxide is the most common material used in semiconductor sensors, and the electrical resistance in the sensor decreases when it comes in contact with the monitored gas. The resistance of the tin dioxide is typically around 50 kΩ in air but can drop to around 3.5 kΩ in the presence of 1% methane. This change in resistance is used to calculate the gas concentration. Semiconductor sensors are commonly used to detect hydrogen, oxygen, alcohol vapor, and harmful gases such as carbon monoxide.

The sensor 1360 can be an ultrasonic gas leak detector that detects the acoustic emission created when a pressured gas expands in a low pressure area through a small orifice (i.e. the leak). Here, the sensor 1360 uses an acoustic sensor(s) to detect changes in the background noise of its environment. Not to be limited by theory, since most high-pressure gas leaks generate sound in the ultrasonic range of 25 kHz to 10 MHz, the sensor 1360 distinguishes these frequencies from background acoustic noise, which typically occurs in the audible range of 20 Hz to 20 kHz. The sensor 1360 then produces an audible, visual and/or haptic notification when there is an ultrasonic deviation from the normal condition of background noise. To be sure, the sensor 1360 cannot necessarily measure gas concentration; however, the sensor 1360 can determine the leak rate of an escaping gas because the ultrasonic sound level depends on the gas pressure and size of the leak.

The sensor 1360 can be a holographic gas sensor that uses light reflection to detect changes in a polymer film matrix containing a hologram. Since holograms reflect light at certain wavelengths, a change in their composition can generate a colorful reflection indicating the presence of a gas molecule. However, the sensor 1360 requires an illumination source(s) such as white light or lasers, and an observer or CCD detector.

In certain embodiments, the WCN 110 is configured to function as a cognitive radio node in a cognitive radio network. As used herein, a "cognitive radio" is a communications node that detects electromagnetic environment in which it operates, detects unused frequency bands, and adapts the radio working parameters to broadcast in these bands. To sense limited or unused frequency bands, the WCN 110 can use different methods for spectrum sensing, such as those known in the art (e.g., matched filtering, cyclostationary-based sensing, waveform-based sensing, wavelet-based sensing, eigenvalue-based sensing, and energy sensing). Two or more detection schemes ("hybrid models") may be utilized together to improve spectrum sensing performance in a cognitive radio network. Spectrum sensing enable the WCN 110 to have information about its environment and spectrum availability.

For example, artificial intelligence and machine learning algorithms can be utilized with hybrid models. Learning algorithms based on artificial neural networks ("ANN") can be used to detect the presence or absence of primary users in a cognitive radio environment. The primary user ("PU") is a licensed user who is assigned a fixed spectrum band and it can use its spectrum band without any interference or disruption from other users in the network. The PU can be in the form of a transceiver unit that is licensed to use the fixed spectrum band of a user that has higher priority or legacy rights on the usage of the fixed spectrum. The PU can be a subscriber that can assess the spectrum with legal protection; a licensed user; of a user that is allocated with licensed spectrum for communications over the network.

Collaborative spectrum sensing ("CSS") is a solution to enhance the detection performance, in which secondary users collaborate with each other to sense the spectrum to find the spectrum holes. The WCN 110 can utilize CSS based on machine learning techniques. For example, to achieve CSS, the WCN 110 can utilize supervised (e.g., support vector machine and weighted K-nearest neighbor) and unsupervised (e.g., K-mean clustering and Gaussian mixture model) classification techniques. In other embodiments, the WCN 110 utilizes a sensing method based on machine learning to engage in spectrum sensing. Here, the sensing method is dependent on signal characteristics and a clustering algorithm for classification. The received signals are classified by using the k-means clustering algorithm known in the art and class parameters, eigenvalues, and covariance are determined. Using the machine learning techniques, the error probability is decreased and the detection performance increased. In other embodiments, the WCN 110 utilizes a decision threshold model to increase the probability of detection and decrease the probability of total detection.

In yet still other embodiments, the WCN 110 achieves spectrum sensing by utilizing a threshold expression to improve detection accuracy. As used herein, an "expression" is a formula that can be evaluated to true or false. Hence, the WCN 110 uses a threshold expression(s) to determine whether the target signal is present or absent. The WCN 110 achieves statistical error analysis using data on detection, miss detection, and false alarm parameters. The spectrum sensing method involves two stages. In the first state, a hypothesis test is created and analyzed in relationship to the noise threshold. In the second state, a threshold expression that minimizes the total error probability is redefined. Said spectrum sensing method is compatible with AWGN, Rayleigh, Rician, Nakagami-m, and Weibull fading channels. "Fading" refers to variation of the attenuation of a signal with various variables. These variables include time, geographical position, and radio frequency. Fading is often modeled as a random process. A "fading channel" refers to a communication channel that experiences fading. Not to be limited by theory, fading may occur due to multipath propagation, referred to as multipath-induced fading, weather (particularly rain), or shadowing from obstacles affecting the wave propagation, sometimes referred to as "shadow fading."

Figure 35:
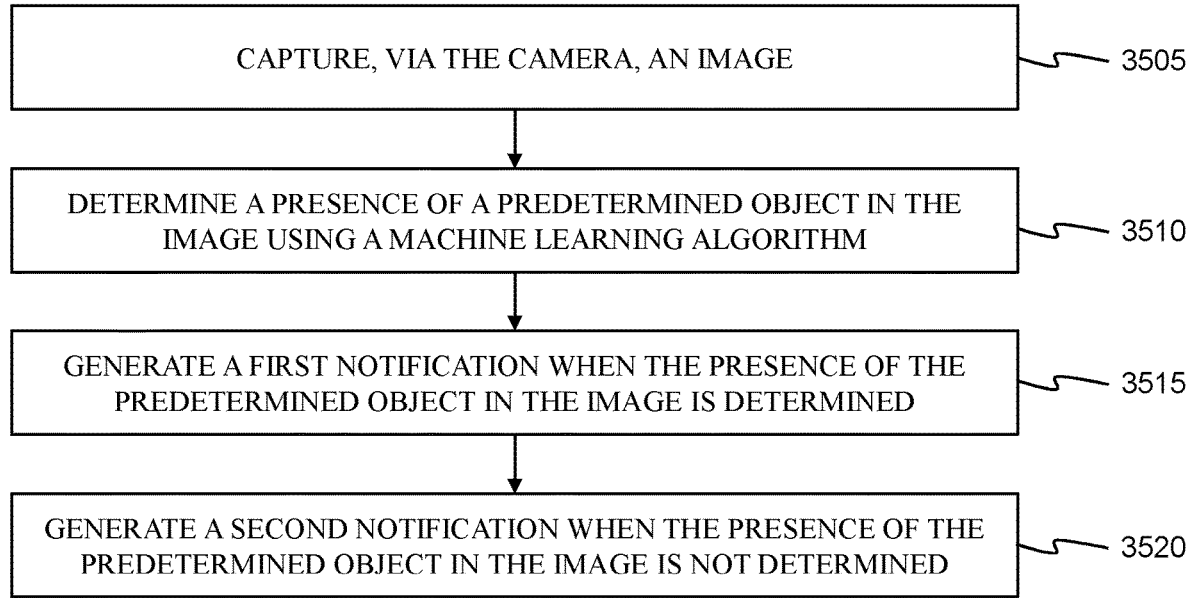
FIG. 35 illustrates the operational steps of the WCN 110 to identify an object using a machine learning algorithm, in accordance with certain embodiments.

FIG. 35 illustrates the operational step so the WCN 110 to identify an object using a machine learning algorithm, in accordance with certain embodiments. To be sure, the operational steps for identifying a chemical vapor signature or a RF signal using machine learning algorithms of the instant disclosure can be performed in a similar manner. Machine learning algorithms can be trained using predetermined object images, chemical vapor signatures, and/or RF signals. For example, a neural network can be trained to identify object images, chemical vapor signatures, and/or RF signals. At Step 3505, an image is captured using the camera 1355. At Step 3510, the presence of a predetermined object in the image is determined using a machine learning algorithm. Applicable machine learning include, but is not limited to, those disclosed in the instant disclosure. At Step 3515, a first notification is generated when the presence of the predetermined object in the image is determined. At Step 3520, a second notification is generated when the presence of the predetermined object in the image is not determined. The first notification and/or the second notification can be conveyed to the user of the WCN 110 via an output device that is communicatively coupled to the control circuit 1310. Applicable output device include, but are not limited to, output devices that are audible, visual, and/or haptic.

The WCN 110 and the computing device 2275 includes respective sets of internal components 3400 and external components 3500 as illustrated in FIG. 34. Each of the sets of internal components 3400 includes one or more processors 3420, one or more computer-readable RAMs 3422 and one or more computer-readable ROMs 3424 on one or more buses 3426, and one or more operating systems 3428 and one or more computer-readable tangible storage devices 3430. The files 1345 are stored on one or more of the respective computer-readable tangible storage devices 3430 for execution by one or more of processors 3420 via one or more of the respective RAMs 3422 (which typically include cache memory). The processors 3420 can include two or more processing cores that operate as separate processors therein; however, all processing cores may not be active unless needed. The processors 3420 can execute code using the processing cores at different stages of execution. The processors 3420 can independently execute two or more instructions threads using the same process resources.

The processors 3420 can process code and/or information using one or more machine language algorithms (trained and/or untrained) stored on the processors 3420 or other tangible storage device in communication therewith. Applicable machine language algorithms include, but are not limited to, linear regression, logistic regression, decision tree, the SVM algorithm, the Naïve Bayes algorithm, the KNN algorithm, K-means, and the random forest algorithm. Training data can be stored on one of the computer-readable tangible storage devices 3430. In the embodiment illustrated in FIG. 34, each of the computer-readable tangible storage devices 3430 is a magnetic disk storage device of an internal hard drive. Alternatively, each of the computer-readable tangible storage devices 3430 is a semiconductor storage device, such as ROM 3424, EPROM, flash memory or any other computer-readable tangible storage device that can store a computer program and digital information.

Internal components 3400 also include a R/W drive or interface 3432 to read from and write to one or more portable computer-readable tangible storage devices 3536, such as a CD-ROM, DVD, memory stick, magnetic tape, magnetic disk, optical disk or semiconductor storage device. The files 1345 and/or the training data can be stored on one or more of the respective portable computer-readable tangible storage devices 3536, read via the respective R/W drive or interface 3432 and loaded into the respective computer-readable tangible storage devices 3430.

Each set of internal components 3400 also includes network adapters or interfaces 3436 such as a TCP/IP adapter cards, wireless Wi-Fi interface cards, or 3G or 4G wireless interface cards or other wired or wireless communication links. The files 1345 and/or the training data can be downloaded to the WCN 110 and/or the computing device 2275, respectively, from an external computer via a network (for example, the Internet, a local area network or other, wide area network) and respective network adapters or interfaces 3436. From the network adapters or interfaces 3436, files 1345 and/or the training data are loaded into the respective computer-readable tangible storage devices 3430. The network may comprise copper wires, optical fibers, wireless transmission, routers, firewalls, switches, gateway computers and/or edge servers.

Each of the sets of external components 3500 can include a computer display monitor 3520, a keyboard 3530, and a computer mouse 3534. External components 3500 can also include touch screens, virtual keyboards, touch pads, pointing devices, and other human interface devices. Internal components 3400 also include device drivers 3440 to interface to computer display monitor 3520, keyboard 3530 and computer mouse 3534. The device drivers 3440, R/W drive or interface 3432 and network adapters or interfaces 3436 comprise hardware and software (stored in storage device 3430 and/or ROM 3424).

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, though the Internet using an Internet Service Provider).

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Based on the foregoing, computer system, method and program product have been disclosed in accordance with the present invention. However, numerous modifications and substitutions can be made without deviating from the scope of the present invention. Therefore, the present invention has been disclosed by way of example and not limitation. As various modifications could be made in the constructions and methods herein described and illustrated without departing from the scope of the invention, it is intended that all matter contained in the foregoing description or shown in the accompanying drawings shall be interpreted as illustrative rather than limiting. Thus the breadth and scope of the present invention should not be limited by any of the above-described exemplary embodiments, but should be defined only in accordance with the following claims appended hereto and their equivalents.

The invention claimed is:

1. A communications node, comprising:
a housing;
an enclosure;
wherein
  the enclosure is an open ended rigid structure that comprises the housing positioned therein in a manner such that the enclosure surrounds the housing;
  the housing comprises:
    a communications device;
    antenna elements conductively coupled to the communications device;
    a control circuit communicatively coupled to the communications device;
    a base;
  the antenna elements
    are each selectively positioned in an antenna slot of the housing;
    comprise a conductive composition comprising:
      fully exfoliated single sheets of graphene;
      a polymer;

the base
    is a rigid structure positioned under and affixed proximate to a first end of the enclosure;
    comprises a plurality of orifices through which thermal energy generated by the housing dissipates;
  the communications node rests on the base;
  the control circuit is configured to establish, via the communications device, a self-organizing LAN with a plurality of nodes and thereby connect directly, dynamically, and non-hierarchically to the LAN; and
  the communications node is man portable;
  the fully exfoliated single sheets of graphene
    form a three-dimensional percolated network within the polymer; and
    are separated on a nanoscale within the polymer.

2. The communications node of claim 1, wherein the control circuit one or more of
  comprises at least two processing cores;
  splits a process into parts that execute simultaneously on the processing cores;
  executes code using the processing cores at different stages of execution; and
  executes two or more instructions threads independently using the same process resources.

3. The communications node of claim 1, further comprising:
  an antenna assembly;
  wherein
    the housing comprises the antenna assembly;
    the antenna assembly comprises an antenna frame;
    the antenna frame
      is a rigid structure;
      comprises the antenna slots;
    the antenna slots
      are oriented in each nodal cardinal direction; and
      vertically orients the antenna elements positioned therein.

4. The communications node of claim 1, further comprising:
  an interfacing plate assembly;
  wherein
    the enclosure comprises a second end positioned opposite the first end;
    the interfacing plate assembly
      is a rigid and metallic structure;
      is horizontally oriented; and
      is hermetically coupled proximate to the second end and thereby seals the second end.

5. The communications node of claim 1, further comprising:
  a board mounting assembly;
  wherein
    the housing comprises the board mounting assembly;
    the board mounting assembly comprises:
      the communication device;
      the control circuit;
      a plate;
    the communications device and the control circuit are each positioned above and proximate to the plate;
    the plate
      is horizontally positioned proximate to the base;
      is hermetically coupled proximate to the first end and thereby seals the first end; and
      is thermally coupled to at least one of the control circuit and the communications device.

6. The communications node of claim 3, wherein
the antenna frame comprises a power source rigidly
affixed therein; and
the antenna elements are peripherally positioned about at
least one half of the power source, the control circuit,
and the communications device.
7. The communications node of claim 5, wherein
the plate
is structurally rigid and metallic;
is externally positioned proximate to the base;
is positioned proximate to one or more of the commu-
nications device and the control circuit;
thermally couples one or more of the communications
device and the control circuit to an ambient envi-
ronment of the communications node; and
the ambient environment is positioned proximate to the
plurality of orifices.
8. The communications node of claim 7, wherein
the board mounting assembly further comprises a passive
heat exchanger;
the passive heat exchanger
is thermally coupled to the plate;
is externally positioned proximate to the plate; and
transfers thermal energy from the plate to the ambient
environment.
9. The communications node of claim 3, wherein
one of the antenna elements comprises an antenna array.
10. A communications node, comprising:
a housing;
an enclosure;
wherein
the enclosure is an open ended rigid structure that
comprises the housing positioned therein in a manner
such that the enclosure surrounds the housing;
the housing comprises:
a communications device;
antenna elements conductively coupled to the com-
munications device;
a control circuit communicatively coupled to the
communications device;
a base;
the antenna elements
are each selectively positioned in an antenna slot of
the housing;
comprise a conductive composition comprising:
fully exfoliated single sheets of graphene;
a polymer
the fully exfoliated sheets of graphene
form a three-dimensional percolated network within
the polymer;
are separated on a nanoscale within the polymer;
the base
is a rigid structure positioned under and affixed
proximate to a first end of the enclosure;
comprises a plurality of orifices through which ther-
mal energy generated by the housing dissipates;
the communications node rests on the base;
the control circuit is configured to establish, via the
communications device, a self-organizing LAN with
a plurality of nodes and thereby connect directly,
dynamically, and non-hierarchically to the LAN; and
the communications node is man portable.
11. The communications node of claim 10, wherein
the control circuit one or more of
comprises at least two processing cores;
splits a process into parts that execute simultaneously
on the processing cores;

executes code using the processing cores at different
stages of execution; and
executes two or more instructions threads indepen-
dently using the same process resources.
12. The communications node of claim 11, further com-
prising:
an antenna assembly;
wherein
the housing comprises the antenna assembly;
the antenna assembly comprises an antenna frame;
the antenna frame
is a rigid structure;
comprises the antenna slots;
the antenna slots
are oriented in each nodal cardinal direction; and
vertically orients the antenna elements positioned
therein.
13. The communications node of claim 12, further com-
prising:
an interfacing plate assembly;
wherein
the enclosure comprises a second end positioned oppo-
site the first end;
the interfacing plate assembly
is a rigid and metallic structure;
is horizontally oriented; and
is hermetically coupled proximate to the second end
and thereby seals the second end.
14. The communications node of claim 13, further com-
prising:
a board mounting assembly;
wherein
the housing comprises the board mounting assembly;
the board mounting assembly comprises:
the communication device;
the control circuit;
a plate;
the communications device and the control circuit are
each positioned above and proximate to the plate;
the plate
is horizontally positioned proximate to the base;
is hermetically coupled proximate to the first end and
thereby seals the first end; and
is thermally coupled to at least one of the control
circuit and the communications device.
15. The communications node of claim 14, wherein
the antenna frame comprises a battery rigidly affixed
therein; and
the antenna elements are peripherally positioned about
at least one of the power source, the control circuit,
and the communications device.
16. The communications node of claim 15, wherein
the plate
is structurally rigid and metallic;
is externally positioned proximate to the base;
is positioned proximate to one or more of the commu-
nications device and the control circuit;
thermally couples one or more of the communications
device and the control circuit to an ambient envi-
ronment of the communications node; and
the ambient environment is positioned proximate to the
plurality of orifices.
17. The communications node of claim 16, wherein
the board mounting assembly further comprises a passive
heat exchanger;
the passive heat exchanger
is thermally coupled to the plate;

is externally positioned proximate to plate; and
transfers thermal energy from the plate to the ambient
environment.

18. The communications node of claim 17, wherein one of the antenna elements comprises an antenna array.

\* \* \* \* \*